United States Patent

[11] 3,624,613

[72] Inventors William B. Smith
RR #1, Box 894, Silver Glen Road, St. Charles, Ill. 60174;
Judson B. Synnott, III, 6095 Chase Ave., Downers Grove, Ill. 60515

[21] Appl. No. 831,006
[22] Filed June 6, 1969
[45] Patented Nov. 30, 1971

[54] COMMON CHANNEL SIGNALING ARRANGEMENT
5 Claims, 20 Drawing Figs.

[52] U.S. Cl. ........ 340/172.5
[51] Int. Cl. ........ H04m 7/00
[50] Field of Search ........ 340/172.5, 147

[56] References Cited
UNITED STATES PATENTS

| | | | |
|---|---|---|---|
| 3,359,543 | 12/1967 | Corr et al. | 340/172.5 |
| 3,403,383 | 9/1968 | Kienzle et al. | 340/172.5 |
| 3,427,594 | 2/1969 | Lavenir et al. | 340/172.5 |
| 3,427,587 | 2/1969 | Carlson et al. | 340/147 |
| 3,427,589 | 2/1969 | Robinson et al. | 340/147 |
| 3,452,330 | 6/1969 | Avery | 340/172.5 |

*Primary Examiner*—Gareth D. Shaw
*Assistant Examiner*—R. F. Chapuran
*Attorneys*—R. J. Guenther and James Warren Falk

ABSTRACT: A data transmission system employing a common signaling channel for transmitting messages is disclosed. A data-processing system is provided at each terminal of the channel and messages transmitted from each terminal over the channel are obtained from the respective data-processing system's memory unit. The signaling channel transmits blocks of words continuously in both directions, idle words being inserted in a block when there are no data messages available to be transmitted from the storage unit. An acknowledgement word is part of every transmitted block of words and identifies the positions of any erroneous words in a previously transmitted block of words. The data-processing system recognizes any data word messages required to be retransmitted from storage and retransmits only the data word message, or the incorrect word itself in the case of a single word message, rather than retransmitting the entire block which may have contained idle words.

INVENTORS
W. B. SMITH
J. B. SYNNOTT III
BY Howard R. Popper
ATTORNEY

FIG. 3A

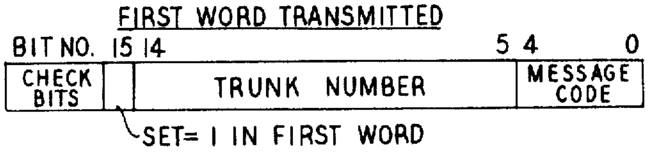

FIG. 3B

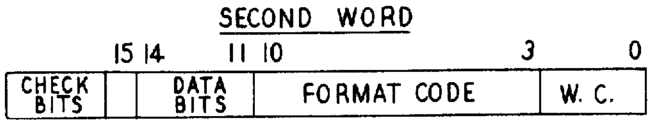

FIG. 3C

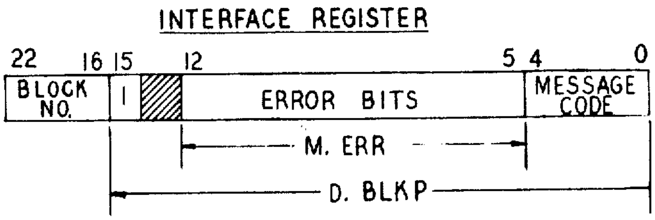

FIG. 3D

TBCL DIRECTORY OF BUFFER ADMIN. TABLES

| |
|---|
| ADDRESS Y(1) OF BUFF. ADMIN. TABLE, TERM 108 |
| |
| |
| ADDRESS Y(9) OF BUFF. ADMIN. TABLE, TERM 208 |
| |

FIG. 3E SCRATCH PAD

| | |
|---|---|
| TEMP | ERROR BITS |
| TEMP 1 | STATUS HI (INST 010); STATUS LΦ (INST 038) |
| TEMP 2 | UPDATED ERROR CONTROL WORD (INST 014 AND 042) |
| TEMP 3 | POSITION OF WORD IN ERROR (INST 015 AND 043) |
| TEMP 4 | ADDRESS OF STATUS WORD (INST 007) |
| TEMP 5 | RETURN ADDRESS STORAGE |

FIG. 3F HEAD CELLS

| | |
|---|---|
| MULTE | (INST 070, 133) IDLE MULTI WORD MSG. BUFFERS |
| HACT | (INST 043) |
| HACT+1 | (INST 041, 044, 047) |
| TBUFE | (INST 116) IDLE BUFFER ADMIN. TABLES |
| LACT | (INST 123, 151) |
| LACT+1 | (INST 121, 124, 127, 149, 152, 155) |
| SINGE | (INST 148) IDLE SINGLE WORD MSG. BUFFERS |

COMMON CHANNEL SIGNALING ARRANGEMENT

BACKGROUND OF THE INVENTION

This invention relates to data transmission systems and more particularly to a data processor arrangement for controlling the efficient transmission of information over one or more common signaling channels which may be subject to interference or other causes of signaling errors.

Prior art signaling systems have employed various techniques in order to achieve accurate transmission of data and facilitate the correction of transmissions when errors have been detected. For example, error-correcting codes have been employed which add sufficient redundancy to transmitted data words or characters so that it is possible not only to detect but also to correct errors in these words at the receiving terminal. While such arrangements are quite satisfactory in many applications, the redundancy introduced by error-correcting codes necessarily reduces the effective rate of information transmission and extra processing time is required to perform the actual correction.

On the other hand, systems are known in which the receiving terminal is equipped simply to detect a transmission error and in these cases the receiving end of the signaling channel must somehow return sufficient information to the sending end to enable the sending end to retransmit the message. When a two-way or duplex data channel is provided, this information may conveniently be returned to the original sending end as a part of one of the next data messages that will be sent in the opposite direction over the channel. One of the techniques employed in this type of system is to transmit uniform length blocks of data words and to include in each such block a check character or word. In such a system it is necessary to transmit each block of data words from storage and the block in storage cannot be erased until the check character is returned from the distant end of the channel. One such system, described in the July, 1965 issue of the Western Union Technical Review at page 118, et seq. and called the EDAC system, employs a check character called a "return control" word in each block of transmitted characters. The "return control" word tells whether a previously transmitted block has been correctly received but it does not tell which word is incorrect and it is therefore necessary to retransmit the entire block.

It happens that in some data transmission systems a given block of words may contain more than one discrete message and, in some cases, a given block of words may contain as many discrete messages as there are words in the block. When an error is detected in one of the single word messages in such a system, it would be desirable to release those areas of storage containing correctly transmitted single- or multiword messages and to retransmit only the single-word message found to be in error.

Furthermore, it would be desirable to be able to transmit a single-word message at any time even in the midst of transmitting a data block containing other and lower priority single- or multiword messages. When such a high-priority word is interjected in a block of other transmitted words it is apparent that the high-priority single-word message will be discrete with regard to, i.e., will have really nothing to do with, whatever other messages may be present in the data block. If an error occurred in such a high-priority word, it would nevertheless still be desirable to be able to retransmit merely that single word notwithstanding that it might not be feasible to include in any "return control" word information whether the incorrect word belonged to a multiword message or was an unrelated, high-priority word. When an error occurs in a short multiword message, it would of course be desirable to retransmit at most only the multiword message rather than all of the words contained in the data block.

It may readily be appreciated that a data transmission system which is constantly in operation even though no actual intelligence is being transmitted exhibits a faster response when intelligence is to be transmitted because it is not necessary to wait for the system to become synchronized. In such a system "idle words" will be transmitted over the signaling channel whenever there is no real intelligence to be transmitted or whenever there is not enough real intelligence to fill all the words in a data block. When an error is detected in one of these data blocks containing both real data words as well as idle words, it would be desirable to cause a retransmission only of an actual data word and to ignore any errors in idle words.

Accordingly, it is a general object of the present invention to provide a high-speed data transmission in which errors, when they arise, may be efficiently corrected.

SUMMARY OF THE INVENTION

The foregoing and other objects are achieved in accordance with the principles of the present invention, in one illustrative embodiment thereof, in which a common signaling channel carries uniform-length blocks of words, one word of each block being an acknowledgment word, sometimes hereinafter referred to as a BLOCK word, and the remaining words of each block being data words or idle words. The acknowledgement word returned to one terminal of the channel by the other terminal thereof indicates the position of any incorrect words in a data block received at such other terminal that was previously transmitted from the one terminal.

Associated with each terminal of the common signaling channel is a data-processing system having a memory unit which includes a plurality of message buffers that store data word messages until the associated terminal can transmit them over the common signaling channel and until the acknowledgment word is returned over the signaling channel signifying that the transmitted words were correctly received. For each block of words that have been transmitted from the storage unit over the signaling channel, a register in the storage unit maintains a high- and a low-priority status word. The status words give the location in the transmitted block of words that were contributed by any of the plurality of high-priority and the low-priority message buffers respectively. When the acknowledgment word is returned to the terminal from the distant end of the signaling channel, the acknowledgment word is first examined to see if it indicates the presence of any erroneous words in the previously transmitted block. If no words were in error, the message buffers storing the data words are released provided that the transmitted block does not contain any multiword messages some of whose words overlap into a subsequently transmitted block. In that case, i.e., when a message buffer has contributed data words to more than one transmitted block, it will not be released until the acknowledgment word for the subsequently transmitted block is received and indicates that all of the words of the message overlapping the two blocks have been correctly received.

When the acknowledgment word indicates that there were some erroneous words in a transmitted data block, the status word for the high-priority message buffer which may have contributed to the transmitted block is first consulted. The acknowledgment word and the high-priority status word are compared, advantageously by product-masking the acknowledgement word with the status word, to obtain an error control word which indicates the position in the transmitted data block of any erroneous data words transmitted from the high-priority message buffer. The error control word thus derived makes it possible for the processor to ignore any erroneous idle words that may have been included in the transmitted block. If the result of the product-masking operation indicates that an erroneous data word was transmitted from the high-priority message buffer, the message buffer which contributed the erroneous word is marked so that its contents may be reloaded amount those messages yet to be transmitted and so retransmitted over the signaling channel by the associated terminal. The marking of the message buffer in this manner may advantageously be included in the message as later retransmitted so that this message may be recognized by the distant end of the signaling channel as a retransmission and, if desired, be given preferential treatment thereat.

When positions in the transmitted block corresponding to correct words constituted by a high-priority message buffer are detected, the responsible buffer is released to be made available for other purposes.

When all high-priority buffers which have contributed data words to the transmitted block have been accounted for, the status word for the low-priority message buffer is obtained and product-masked by the acknowledgment word to obtain an error control word for messages contributed by any of the low-priority message buffers. If the error control word indicates the presence of any erroneous words, a test is sequentially made of the remaining words in the transmitted block to determine whether there were any correctly transmitted single- or multiword messages whose message buffers may be released or whether there were message buffers containing erroneous words which should be reloaded for retransmission.

In accordance with one aspect of the present invention, when a correctly transmitted word is found to be part of a multiword message, the count of correctly received words for the message is incremented until the count is found to equal the word count of words transmitted from the multiword message buffer. When the count of words verified equals the count of words transmitted from the multiword message buffer, the message buffer is linked to a list of buffers which have had their contents verified and hence are available for other uses.

In accordance with another aspect of the present invention, when an incorrectly transmitted word is found to be part of a multiword message, the count of words of the message so far examined is incremented until the count equals the count of words in the message. The multiword message buffer containing the erroneous word is then added to the list of buffers whose contents is to be retransmitted over the common signaling channel.

Accordingly, a feature of the present invention is a data transmission system which stores only the data words contributed to blocks of transmitted words and which, when an error is detected in a transmitted block, retransmits only those data words in a transmitted block constituting an integral message.

Another feature of the data transmission system of the present invention is the comparing at the transmitting end of a data channel of an acknowledgment word which identifies the position of any incorrect words in a previously transmitted word block with a word which indicates the position in the transmitted block of data words contributed by any of the plurality of high- or low-priority message buffers which store data words at the transmitting end of the channel until the acknowledgment word received thereat indicates that all of the data words have been correctly received at the other end of the channel.

The foregoing and other objects and features may become more apparent by referring now to the detailed description and drawings in which:

FIGS. 3A and 3B show the format of the first and second word of an illustrative message transmissible over the common signaling channels of the system of FIG. 1;

FIG. 3C shows an interface register for receiving the BLOCK word returned to a terminal over a common signaling channel of FIG. 1;

FIG. 3D shows the registers constituting the directory of buffer administration tables employed in administering the message buffers of the present invention;

FIG. 3E shows the registers for temporarily storing the error bits, the high- and low-priority status words, the error control word, the position of any word found in error, the location of the status word relating to a block of data words previously transmitted over a common signaling channel of FIG. 1, and a return address storage location;

FIG. 3F shows the head cells employed in the illustrative program which processes the BLOCK word information;

Figure 1:
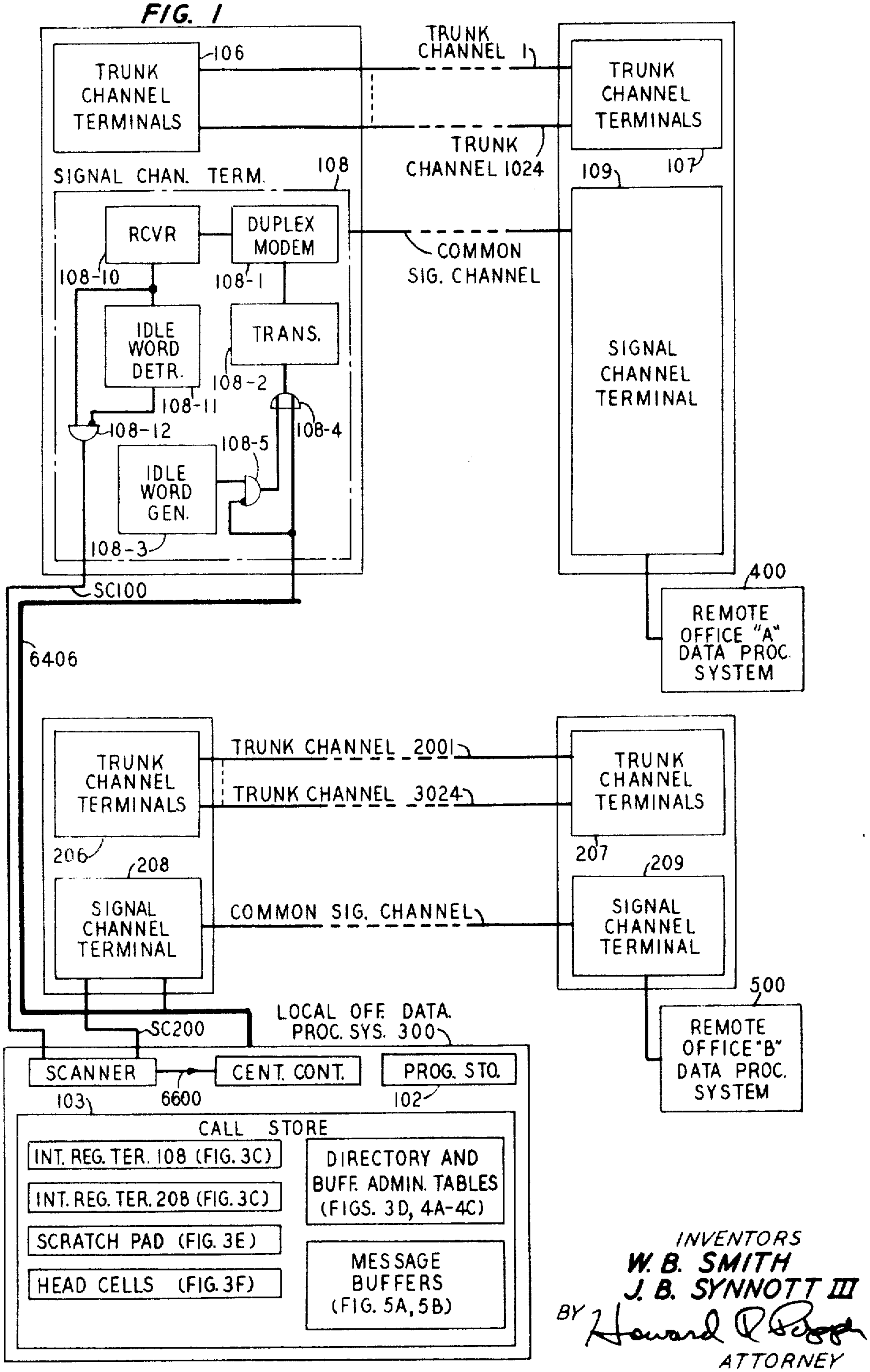
FIG. 1 shows, in block diagram form, an overall schematic of the data transmission system of the present invention.

Referring now to FIG. 1, there is shown a data transmission system employing common channel signaling. This system will be described with respect to a local central office which contains data-processing system 300, trunk channel terminal 106 and 206 and common signal channel terminals 108 and 208. Remote from the central office comprising the aforementioned equipment are two distant central offices A and B which are accessible for communication purposes over a plurality of trunk channels 1–1024 and 2001–3024, respectively. At office A are trunk channel terminals 107, common signal channel terminal 109 and data-processing system 400 which, in all respects, may be similar to local office data-processing system 300. At remote office B there are, similarly, trunk channel terminals 207, signal channel terminal 209 and data-processing system 500.

Trunk channels 1–1024 may be thought of as carrying individual voice conversations between the local central office and remote office A and the common signaling channel extending between terminals 108 and 109 may be thought of as carrying the information necessary for setting up connections to and from the trunk channel terminals 106 and 107 at the respective offices. The signaling information carried over the common signaling channel would typically include such information as the called telephone number which is transmitted in the forward direction from the calling to the called office and answer supervision which is transmitted in the reverse direction. In this regard, the called telephone number would in most instances be in the form of a multiword message whereas answer supervision would normally be expected to be a single-word message. Furthermore, since answer supervision is transmitted at a time when connections have been made in both central offices to and from the respective trunk channel terminals 106 and 107 it would normally be expected that answer supervision should be accorded a higher priority than called number information which is transmitted at a time when the investment in switching connections is not nearly as extensive. Accordingly, in the illustrative embodiment the high-priority single-word message hereinafter referred to may be thought of as an answer supervision message and the low-priority multiword message hereinafter referred to may be thought of as a called number message. In the illustrative data format for the data words to be transmitted over the common signaling channel, provision has been made for transmitting up to 29 other types of messages in addition to the foregoing called number and answer supervision messages.

FIG. 3A shows the format of the first word of a message that may be transmitted over the common signaling channel from terminal 108 for example. The message code portion, bits 0–4, indicates whether the message is a called number message, an answer supervision message, an idle word message, etc.

Bit number 15 is set to "1" in the first word of a multiword message. A number of check bits are included so that at the receiving end a test may be made in the conventional manner to determine whether the word is correct. These check bits are later used when the word is received at the distant end of the common signaling channel by apparatus thereat not shown.

To formulate a BLOCK word which the distant end will return over the signaling channel, each bit position in the BLOCK word will correspond to a word, such as that shown in FIG. 3A, in a previously transmitted block of words. FIG. 3B shows the second word of a data message, the fields of which include from right to left, a word count field that indicates the number of data words in the message, a format code field which may provide any desired information concerning the format of the message, the data bits of the message and series of the message, the data bits of the message and a series of check bits which perform the same function as the check bits of the first word, FIG. 3A. Regardless of the number of data words or idle words in a transmitted block one word thereof, which advantageously may be the last word of the transmitted block, is reserved for a block word. The format of the block word may be the same as that of the first word except that the trunk number field would instead be used to identify the erroneous word positions in a previously transmitted block. These error bits in the block word received over the signaling channel at a terminal such as terminal 108 are entered into an interface register FIG. 3C so that the message previously transmitted from the terminal and which corresponds to the received block word may be verified.

FIG. 1 shows the manner in which idle word messages are transmitted by terminal 108. Normally data words are supplied over bus 6406 to terminal 108 for transmission over the common signaling channel. When data words are present on bus 6406 inhibit gate 108–5 in terminal 108 is inhibited. However, when there are no actual data words available in call store 103 to be placed on bus 6406 inhibit gate 108–5 is unblocked and idle word generator 108–3 provides a word of the format of FIG. 3A, bits 0–4 being all zeros, to transmitter 108–2 for transmission over the common channel via duplex modem 108–1.

Since it is desired that data-processing system 300 not be burdened by considering idle words that are received at terminal 108 over the common signaling channel an idle word detector 108–11 is associated with receiver 108–10 such as the idle word detector 108–11 will activate the inhibit terminal of gate 108–12 to prevent receiver 108–10 from delivering an idle word to the scanner of data-processing system 300. The information which receiver 108 is permitted to deliver to data-processing system 300 is entered by the scanner thereof over cable 6600 into the L-register in the common control FIG. 2 of the data-processing system. In the normal course of events the L-register places the information into call store 103 in an interface register thereof assigned to terminal 108. Similarly, data-processing system 300 scans the receiver output associated with signal channel terminal 208 and eventually inserts the information provided therefrom into a call store interface register FIG. 3C assigned to terminal 208. The central control FIG. 2 and call store 103, of the illustrative embodiment are portions of a known data-processing system described in detail in the copending application of R. W. Downing et al., Ser. No. 334,875, filed Dec. 31, 1963 U.S. Pat. No. 3,570,008 issued Mar. 9, 1971, and in the Bell System Technical Journal Sept., 1964, particularly pages 1,845 through 1,959 dealing with the central processor organization, and the stored program organization and pages 2,021 through 2,054 dealing with the peripheral bus system. Reference may also be made to the copending application of J. A. Harr, Ser. No. 590,928 now abandoned filed Oct. 31, 1966; for further information concerning the basic data-processing system employed in the illustrative embodiment. However, for the convenience of the reader, the salient aspects of the operation of the known system shown in FIG. 2 will now be described.

Figure 2:
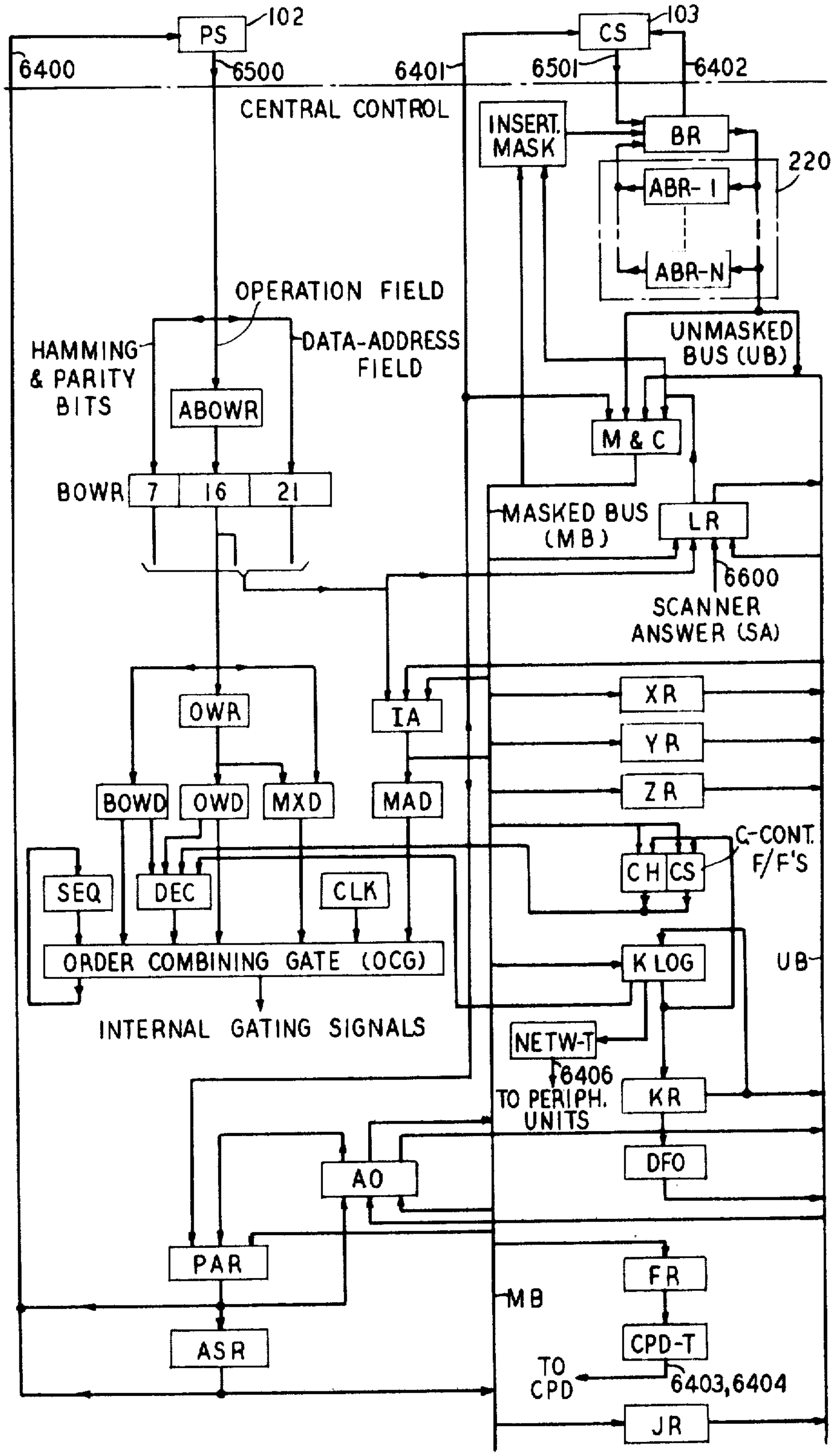
FIG. 2 shows a prior art data processor which may be employed in the system of FIG. 1.

Description of FIG. 2

The data-processing system comprises a program store 102 and a changeable temporary store or call store 103, both hereinafter from time to time generically being referred to as the memory. The address of an instruction in program store 102 is transmitted from the program address register PAR over bus 6400 to the program store. The address is generally incremented in each cycle of operation by the add-one circuit AO in order to obtain successively numbered instructions. One of the sequencers in block SEQ interrupts the normal execution of orders and controls a transfer to a timetable program at the beginning of every 5-millisecond interval. Thereafter, since the address in the program address register PAR is continuously incremented, the instructions in the timetable program are executed in sequence.

Information contained in call store 103 is read by transmitting the address of the desired call store word over bus 6401. The selected word is read out on transmission bus 6501 and entered into data buffer register BR. To write a word into call store 103, the bits of the desired word are applied to call store write bus 6402 by buffer register BR and the location in which the word is to be written in the call store is applied to bus 6401 by index adder IA. A central pulse distributor CPD (not shown) is provided to communicate with peripheral units (not shown) and is addressed over buses 6403 and 6404. Communication with various network units is possible over bus 6406. Information from peripheral points in the system is returned to the processor over scanner answer (SA) bus 6600 and entered into the logic register LR.

The equipment shown on the left side of FIG. 2 is used to determine the action to be taken in accordance with the instructions read out of program store 102. Each instruction, in addition to Hamming and parity bits for error detection and correction may include an operation field, a data-address field, and an index register identity. The three parts of each instruction, when shown hereinafter, are separated by commas. When a part of an instruction is to be omitted, an extra comma is used as a marker to that effect.

When program store 102 is read out, the operation field portion of a program order word is gated into the auxiliary buffer order word register ABOWR while the data-address field and the Hamming bits of the order word are directly gated into the buffer order word register BOWR. The auxiliary buffer order word register ABOWR is provided before the register BOWR to prevent an operation field being placed in the register BOWR before it has been cleared of the prior order word. The numbers 7, 16 and 21 inside the buffer order word register indicate, respectively, the number of bits available to represent the seven possible Hamming and parity bits, the 16 possible operation code and index register-identifying bits, and the 21 data-address indicating bits. The data-address (DA) field is then transmitted to the index adder IA where indexing takes place if required. In the indexing step the DA field is modified by the addition to it of the word contained in one of the system registers, e.g., register XR. The sum derived by the index adder is the data or the address used in the execution of the order.

As multiple cycle overlap operation is possible in this system, and order word register OWR is provided in addition to the buffer order word register BOWR, together with their respective decoders OWD and BOWD; a mixed decoder MXD resolves conflicts between the program words in the two registers OWR and BOWR. The outputs of the decoders, together with selected clock signals from clock source CLK, are combined in the order combining gate circuit OCG which operates selected gates in the proper time sequences. The order combining gate circuit OCG thus generates the proper sequences of gating signals to carry out the indexing cycle and the execution cycle of each of the sequences of orders in turn as they appear first in the buffer order word register BOWR and then in the order word register OWR.

A memory address decoder MAD decodes the addresses from the index adder IA and controls the order combining gate circuit OCG to direct properly addressed equipment, e.g., the program store, call store, or registers.

The internal data-processing structure is built around two multiconductor buses, the unmasked bus UB and the masked bus MB, and a link for moving a data word from one register to another. The mask and complement circuit M&C connects the unmasked bus to the masked bus and provides means for logically operating upon the data as it passes from the former to the latter. The logical operation to be performed, which may include among others, product mask (AND), union mask (OR), exclusive-OR mask (EXCLUSIVE-OR), and complementing, is prescribed by the operation field of the instruction word as decoded by either the buffer order word decoder BOWD or the order word decoder OWD.

Decision logic circuit DEC is provided to permit the executing of decision orders which either permit the processor to continue with the execution of the current sequence of orders or to transfer to a new sequence of orders. The decision order specifies that certain information is to be examined as the basis for the decision. The information is obtained from the control homogeneity circuit CH or the control sign circuit CS, or selected outputs of the K-logic circuit KLOG. The basis of the decision may be that the information examined is arithmetic zero, less than zero, greater than zero, etc.

As mentioned above, a plurality of sequence circuits SEQ are provided, which circuits share control of the data-processing with the various decoders. These circuits contain counter circuits, the states of which define the gating actions to be performed by the sequence circuits. The sequence circuits control the time of operation and execution of various of the orders.

Program Instructions–Introduction

In the following description of program orders a symbolic instruction format is employed. The symbolic program order is divided into the following "fields" or columns:

INST. NO. LOCATION OPERATION CODE DA,RM,LCJ

The location field is used for assigning a symbolic address to an instruction which may then be referred to by other instructions in the program. The operation code field is used to specify the operation to be executed in this step of the instruction. The fields DA, RM, and LCJ are the variable and option fields. The DA field is used to specify data or an address. The R subfield may be used to specify the buffer register BR, the X-index register XR, the Y-index register YR the Z-index register ZR, the K- (accumulator) register KR, the F- (first one) register FR, or the J- (return address) register JR, all shown in FIG. 1. The M-subfield is used only on transfer orders, conditional or unconditional, to indicate, by the appearance of the letter M after the first comma, that the transfer is indirect. The L subfield is used on certain orders to indicate one of the logical maskings employing the contents of the logic register LR, as set either by a previous instruction (PL or EL) or by the DA field of the present instruction (PS or ES). The appearance of the letter P in this subfield indicates the logic product ("and") function and specifies that each bit of the word on the way to its destination is matched with the corresponding bit of the logic register LR. When both are "1's," a "1" replaces the contents of that position of the word before it reaches its destination. When either is a "0," a "0" replaces the contents of that position of the word before it reaches its destination. The letter E is used to designate insertion masking. The CJ subfield, when used, may specify either C that the information on the unmasked bus is to be complemented en route to its destination, or J that the return address, i.e., the address following the conditional or unconditional transfer order, is to be placed in the return address register JR in the event a transfer does occur.

The illustrative program makes use of a number of operation codes such as: MK (also MX, MY, MZ similar to MX except for the register involved); WK (also WF, WY, WZ, WX similar to WK except for the register involved); CWK; TCAZ; KM (also ZM, XM similar to KM except for the register involved); AMK; T; AZR; CMK; and TCAU. Each of these codes will be briefly described as they are employed in the ensuing description of the invention. For further and more detailed background information on the order structure or any instruction may be obtained by consulting the "Index" of the above-mentioned Doblmaier application.

In the ensuing description (with the exception of FIG. 3D) all of the apparatus employed will, for the sake of simplicity, be assumed to be engaged in the processing of a BLOCK word returned over the common signaling channel to terminal 108.

Figure 6A:
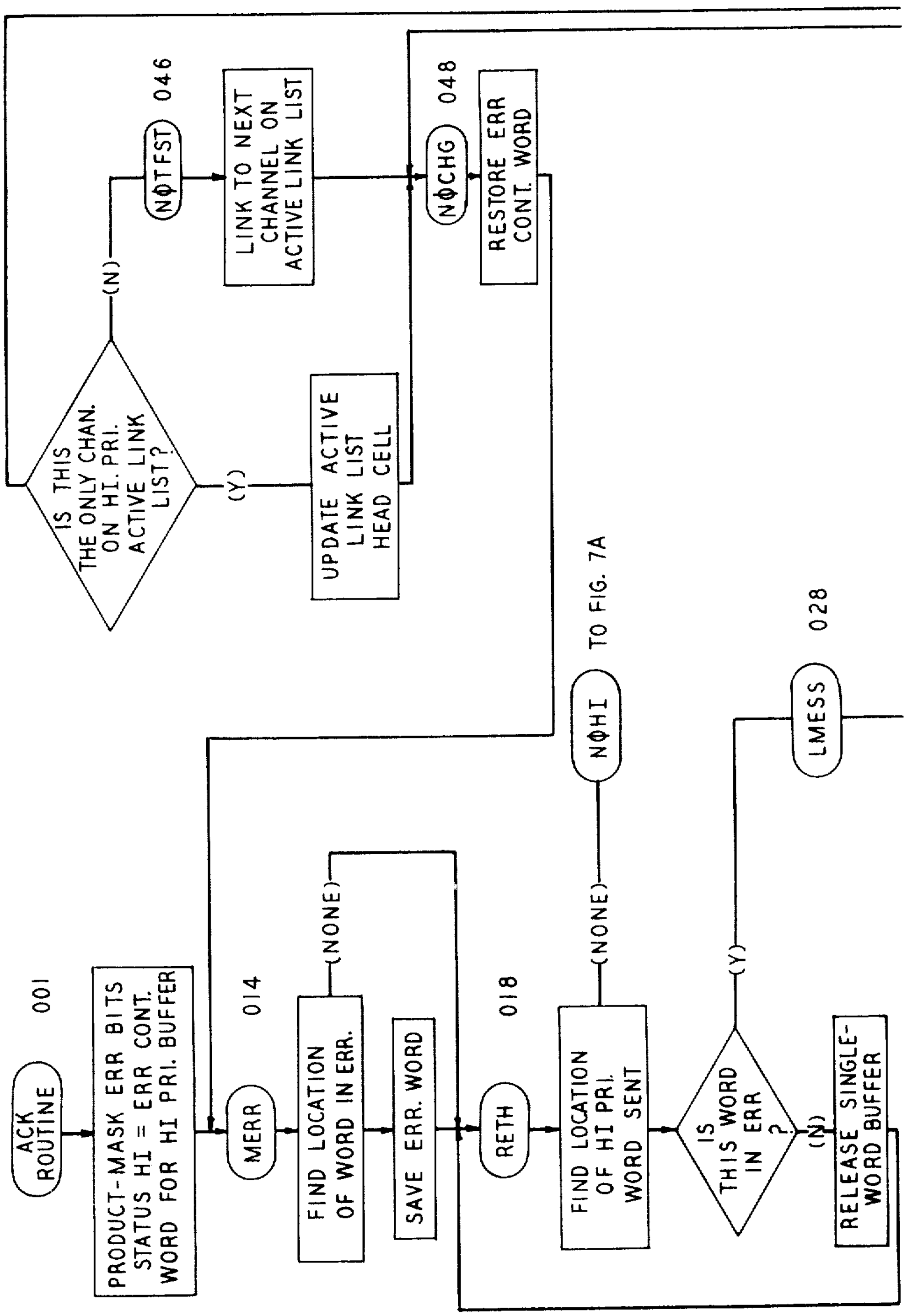
FIGS. 6 through 10 show the flow charts for processing the BLOCK word returned over the common signaling channel of FIG. 1.
Figure 6B:
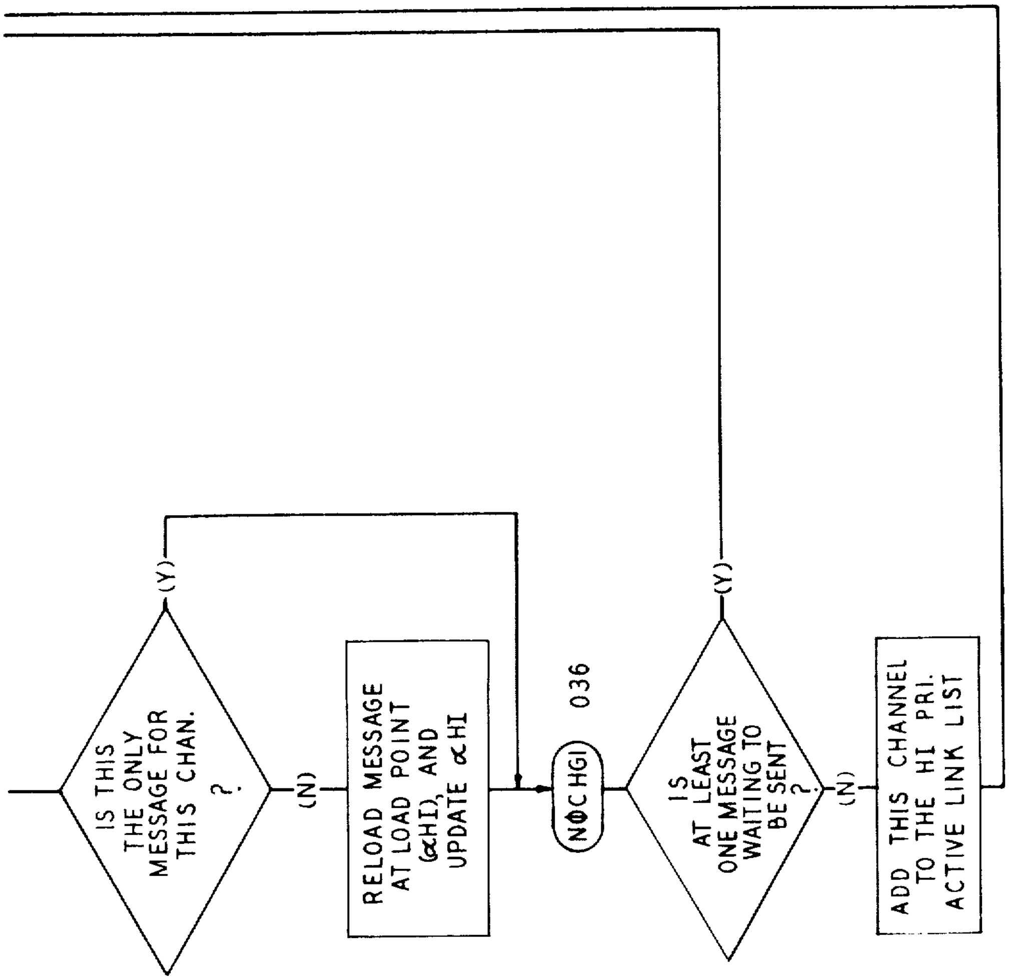

Referring now to FIG. 3C when the BLOCK word has been received at terminal 108 of the common signaling channel it is stored in the interface register assigned to the terminal. Assuming that each BLOCK word returned to terminal 108 over the common signaling channel from office A relates to a block of words previously transmitted by terminal 108, the block numbers may be kept track of locally and need not be transmitted over the channel. Accordingly, when the BLOCK word is entered into the interface register, FIG. 3C, from the common signaling channel, the block number will be locally available in the interface register. The address of the aforementioned interface register is stored in the F register FIG. 2 and the number of the common channel over which the BLOCK word was received is available in the X-register at the time the acknowledgment routing is entered. The first instruction in the acknowledgement routine illustrated in FIGS. 6 through 10, of which instructions 001 through 049 are shown in FIG. 6, is

001 ACK MK M.ERR,F,S

In this instruction the letter S in the option field indicates that the mask, M.ERR for reading the error bits should be taken from memory and inserted in the L-register. The letter F in the index register field together with the memory-to-K-register operation code, MK, indicate that the contents of the memory location given by the address contained in the F-register shall be entered into the K-register. Since the address in the F-register is the address of the interface register storing the BLOCK word, the BLOCK word is entered in the K-register. The actual bit positions defined by the mask M.ERR are assigned during compilation and for simplicity need not be detailed herein.

002 HMZ −D.BLKP, 0, F,PL

In this instruction the word which was previously put into the K-register is right-adjusted by the amount "D.BLKP" so that the "block number" bits are right-adjusted in the K-register. Thereafter, the word in memory at the location specified by the contents of the F-register, i.e., the word obtained from the interface register FIG. 3C, is product-masked by the contents previously inserted into the L-register and the result is placed into the Z-register. Since the L-register had the mask for reading the error bits of the word in the interface register, the result of this product masking is to place only the error bits positions of the BLOCK word in the Z-register, all other bit positions of this register being set to "0." If there are any errors, it is necessary to determine whether these error bits identify words received in error that were transmitted from a high-priority message buffer or whether these were words transmitted from a low-priority message buffer.

003 ZM TEMP,SF

The error bits (if any) contained in the Z-register are saved in memory location TEMP. Register F is set to the address of TEMP.

004 MYMZ TBCL,X

The Y- and Z-registers are provided with the address of the buffer administration table serving terminal 108. This address, Y1, is stored in the first word of the TBCL directory of buffer administration tables, FIG. 3D. The address of the word in the TBCL directory in which the address of the buffer administration table serving a particular terminal is found is obtained by adding the address of the directory, TBCL, to the channel number in the X-register. The address of the buffer administration table serving terminal 108 is entered by this instruction into the Y- and Z-registers.

005 AWK A.STATUS,Z

In this instruction, the right-adjusted block number contained in the K-register is added to the buffer administration table address contained in the Z-register plus an index to the status words in the table. The sum, in the K-register, of the block number and the buffer administration table address plus index gives the location in the appropriate buffer administration table FIG. 4B of the status word for the transmitted block. As shown in FIG. 4B, there is one status word for each transmitted block. The status word for block 1, for example, contains an ordered representation of bits to indicate those positions in the block containing data words contributed by the low- or high-priority message buffers. If neither buffer contributed a data word to a given word position in block 1, the bit positions in "STATUS LO" and "STATUS HI" corresponding to the given word position will each be "0." When both these bit positions are "0," an idle word was transmitted by the transmitting terminal.

006 KM TEMP4

The address of the status word in the K-register is saved in memory at location TEMP4.

007 MK M.STHI,K,PS

008 HC D.STHI

The mask for reading the status bits in the high-priority buffer is put into the L-register. The status word, at the address specified in the K-register is product-masked by the contents of the L-register and the result, i.e., the high-priority status bits of the status word are put into the K-register, which are then right-adjusted.

009 KM TEMP1

The high-priority status bits pertaining to the transmitted block are saved in memory at TEMP1.

010 HPMK D.ERR,0,F

Register F contains the address of location TEMP. The high-priority status bits in K are shifted left to coincide with the position of the error bits stored at location TEMP. Then the logical product of the error bits in TEMP and the high-priority status bits contained in the K-register replaces the contents of the K-register. Accordingly, the K-register now contains a resultant error control word whose "1" bits identify errors in data words that were previously transmitted from the high-priority transmitter buffer.

011 HC D.ERR

This instruction right-adjusts the error bits.

012 WL 24

013 LM TEMP3

These instructions initialize the L- register and location TEMP3 in the case that no errors were detected in the previously transmitted block.

014 MERR TZRFZ RETH

If the K-register contains no "1's," indicating that there were no errors in the transmitted block, transfer is made to location RETH, i.e., instruction 018. On the other hand, if the K-register contains any "1's," the position of the rightmost "1" is recorded in the F-register and this rightmost "1" in the K-register is zeroed.

015 KM TEMP2

The updated error control word contained in the K-register, i.e., the word containing the remaining error "flags," is stored in memory at TEMP2.

016 FM TEMP3

The position of the first erroneous data word is transferred from the F-register and saved in memory at TEMP3.

017 WL 0,F

The contents of the F-register are transferred to the L-register so that the L-register will have the position of the first erroneous data word when instruction 021 is executed.

018 RETH MK TEMP1

The status bits for the high-priority buffer are entered into the K-register.

019 TZRFZ NOHI

If the status bits in the K-register indicate that no words were transmitted from the high-priority transmitter buffer, transfer is made to symbolic location NOHI. Assuming that some words were transmitted, the position of the rightmost "1" bit in the K-register is stored in the F-register, the rightmost "1" bit is zeroed and instruction 020 is executed.

020 KM TEMP1

The status bits for the high-priority transmitter buffer are saved in memory at location TEMP1.

021 SLR 0,F

From the contents of the F-register, i.e., the position of the first data word transmitted from the high-priority buffer, is subtracted the contents of the L-register which identifies the position of the first word transmitted in error from the high-priority buffer. If the bit positions of the L- and F-registers agree, the result is zero and the C-control flip-flops would be so set. With the C-control flip-flops set to indicate arithmetical zero, transfer is made to location LMESS (instruction 028) right after instruction 022 is executed. If the bit positions do not agree, indicating that the first word transmitted from the high-priority buffer was not in error, the C-control flip-flops will indicate arithmetic nonzero and no transfer will be made when instruction 022 is executed.

022 TCAZ LMESS

Transfer is made to symbolic location LMESS (instruction 028) if the C-control flip-flops are arithmetic zero, that is, transfer is made if the bit positions agree. Agreement indicates that the message transmitted from the high-priority buffer was in error and must be reloaded at the end of the list. On the other hand, if the bit positions disagree, this entry is not in error, and since it is assumed that high-priority messages consist of only single words, the message may be removed from the list since it was transmitted correctly.

023 MZ ΓHI,Y

Since the message was correctly transmitted from the high-priority buffer, the acknowledgment pointer, i.e., the address of the "link word" of the message buffer which holds this message is placed in the Z-register. The location of the acknowledgement pointer is computed by adding the generic displacement for high-priority acknowledgment pointers, ΓHI, to the address of the relevant buffer administration block stored in the Y-register. In FIG. 4C it is seen that the high-priority acknowledgment pointer is stored in the word which is displaced by the amount ΓHI from the initial address Y(1) of the buffer administration table FIG. 4A.

024 ENTJ RSINGE

025 WK ΓHI,Y

Instructions 024 and 025 are executed if the single-word message was correctly transmitted. Instruction 024 will transfer control to the subroutine RSINGE (Instruction 159) after executing instruction 025, which places the address of the acknowledgment pointer for high-priority messages (ΓHI plus the contents of Y) into the K-register. The J-register is set to the return address, instruction 026. The subroutine RSINGE will release the message buffer which stored the single word message by putting it back on the idle link list for these buffers, and then will return to instruction 026.

026 ENTJ RETH

027 ML TEMP3

These instructions cause a return to location RETH, instruction 018, with the L-register set with the position of the next word found in error.

The following instructions are executed when a message being acknowledged is determined to have been transmitted in error. These instructions reload the message at the end of the list of messages which are to be transmitted.

028 LMESS MZ ΓHI,Y

The acknowledgment pointer, i.e., the address of the first word in the message buffer assigned to this channel, is entered into the Z-register. The first word of every message buffer is the LINK word which contains the address of the first word of the next message buffer for this channel.

029 MC 0,Z

The LINK word in the first message buffer is entered into the B-register and the C-control flip-flops are set in accordance therewith.

030 TCAZ NOCHG1

Transfer is made to symbolic location NOCHG1 (instruction 036) if the C-control flip-flops indicate arithmetic zero, i.e., the LINK word is zero indicating that there are no further messages in the list for this channel.

031 BM ΓHI,Y

Since the LINK word is not zero, indicating that there is at least one more message for this channel, the LINK word is stored in the acknowledged pointer.

032 EZEM 0,Z

The LINK work in the message buffer which contributed the erroneous word to the transmitted block is zeroed.

033 MF αHI,Y

The load pointer for the high-priority message buffer for this channel is loaded into the F-register.

034 ZM 0,F,S

The address of the message buffer which contributed the erroneous message to the transmitted block is entered into the first or LINK word of the message buffer given by the LOAD pointer. Also, the L-register is cleared for possible use in instruction 021.

035 ZM αHI,Y

The LOAD pointer is updated with the address of the LINK word of the message buffer containing the message to be retransmitted.

036 NOCHG1 MF βHI,Y

The contents of the high-priority SEND pointer are placed in the F-register. The C-control flip-flops will indicate whether or not the SEND Pointer was set to zero.

037 TCAU NOCHG

If the SEND pointer is not set to zero, signifying that at least one message is currently awaiting transmission, then a transfer will be made to location NOCHG (instruction 048) On the other hand, if the SEND pointer is set to zero, it is necessary to initialize the SEND pointer and link this buffer administration block to the high-priority active linked list to ensure the retransmission of the message found to contain an error.

038 ZM βHI,Y

The LINK word address of the message buffer containing the message to be retransmitted is inserted into the high-priority SEND pointer.

039 EZEM LINKHI,Y

The forward link word is the zeroed, signifying that this buffer is now at the end of the list.

040 WF LINKHI,Y

The high-priority forward link word address (see FIG. 4C) is placed in the F-register.

041 MK HACT+1

The contents of the second word of the head cell for the high-priority active linked list (FIG. 3F) of buffer administration blocks is placed in the K-register. The memory location HACT+1 contains the high-priority forward link address of the last buffer administration block on the high-priority linked list, and the location HACT contains the forward link address of the first buffer administration block on the list. The head cell is used by the SEND routine to locate and transfer messages to the transmitter. If the contents of HACT+1 is zero, then the list is empty.

042 TKAU NOTFST

The transfer to NOTFST (046) is made if the active list is not empty.

043 FM HACT

The high-priority link word address for the buffer administration block being processed is loaded into the first word of the high-priority active linked list head cell.

044 FM HACT+1

The same address is loaded into the second word of the head cell, implying that this buffer administration block is the only one on the list.

045 T NOCHG

The program now transfers to NOCHG (instruction 048).

046 NOTFST FM 0,K

Location NOTFST is entered from instruction 042 if at least one other buffer administration block is linked to the high-priority active linked list. Instruction 046 moves the forward link address of this buffer administration block into the forward link address of the former last member on the high-priority active linked list.

047 FM HACT+1

Instruction 047 loads the forward link address into the second word of the active head cell, thereby recording the identity of the new last member of the list.

048 NOCHG ENTJ MERR

A transfer will be made back to location MERR (instruction 014) after instruction 049 is executed.

049 MK TEMP2

This instruction restores the previously updated error control word to the K-register. Instructions 011 through 049 are reexecuted until instruction 019 determines that there are no unchecked entries in any high-priority message buffer that contributed a word to the transmitted block. When all such buffers have been checked instruction 019 causes a transfer to instruction 050.

Now tests will be made for errors in any words in the block that were transmitted from the low-priority buffer. It will be recalled that location TEMP in memory contains the error bits obtained from the BLOCK word, that location TEMP4 contains the address of the status word for the block, that the Y-register contains the buffer administration table address for the common signaling channel being processed and that the X-register contains the number of the common signaling channel.

050 NOHI MK TEMP4

Figure 7A:
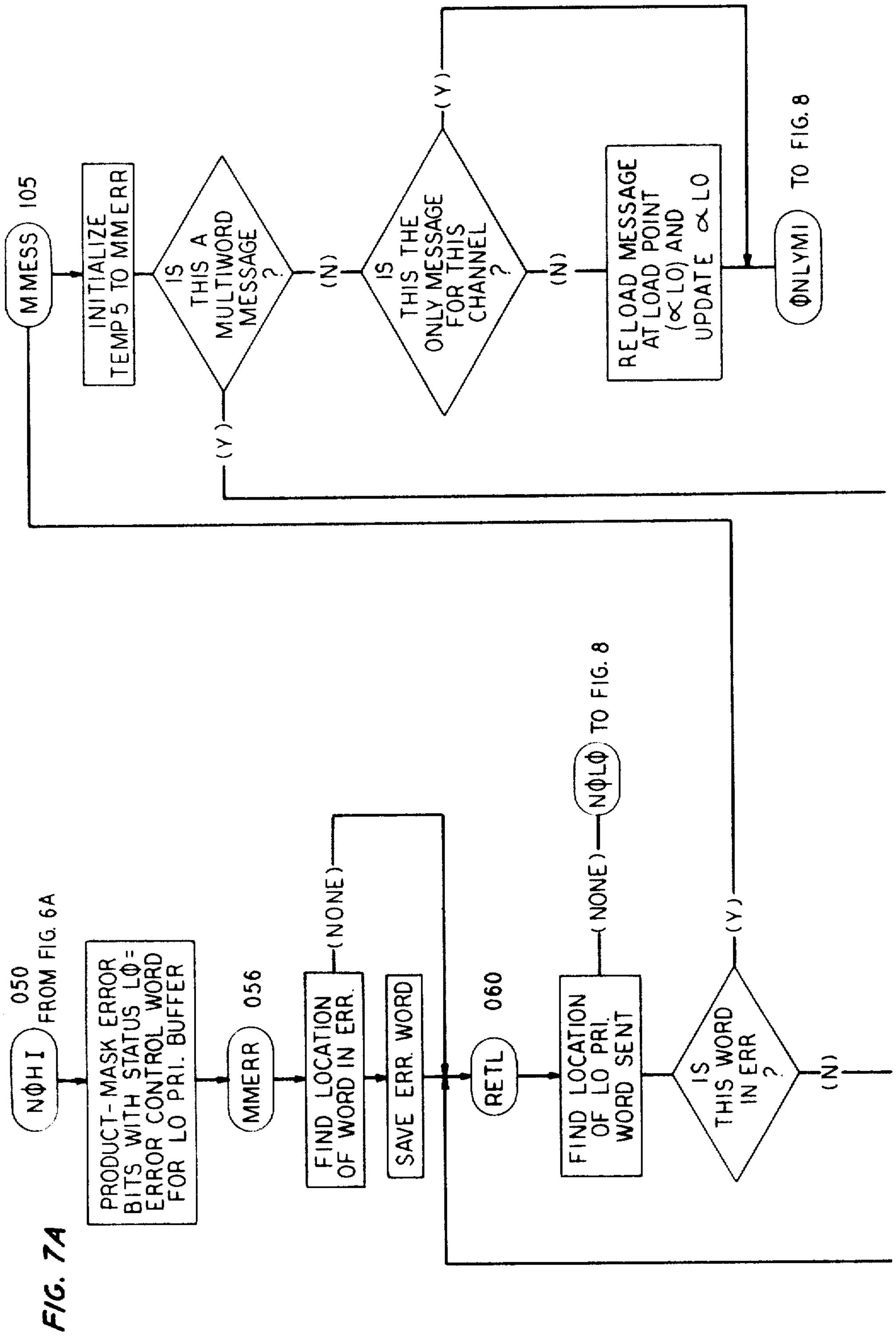
Figure 7B:
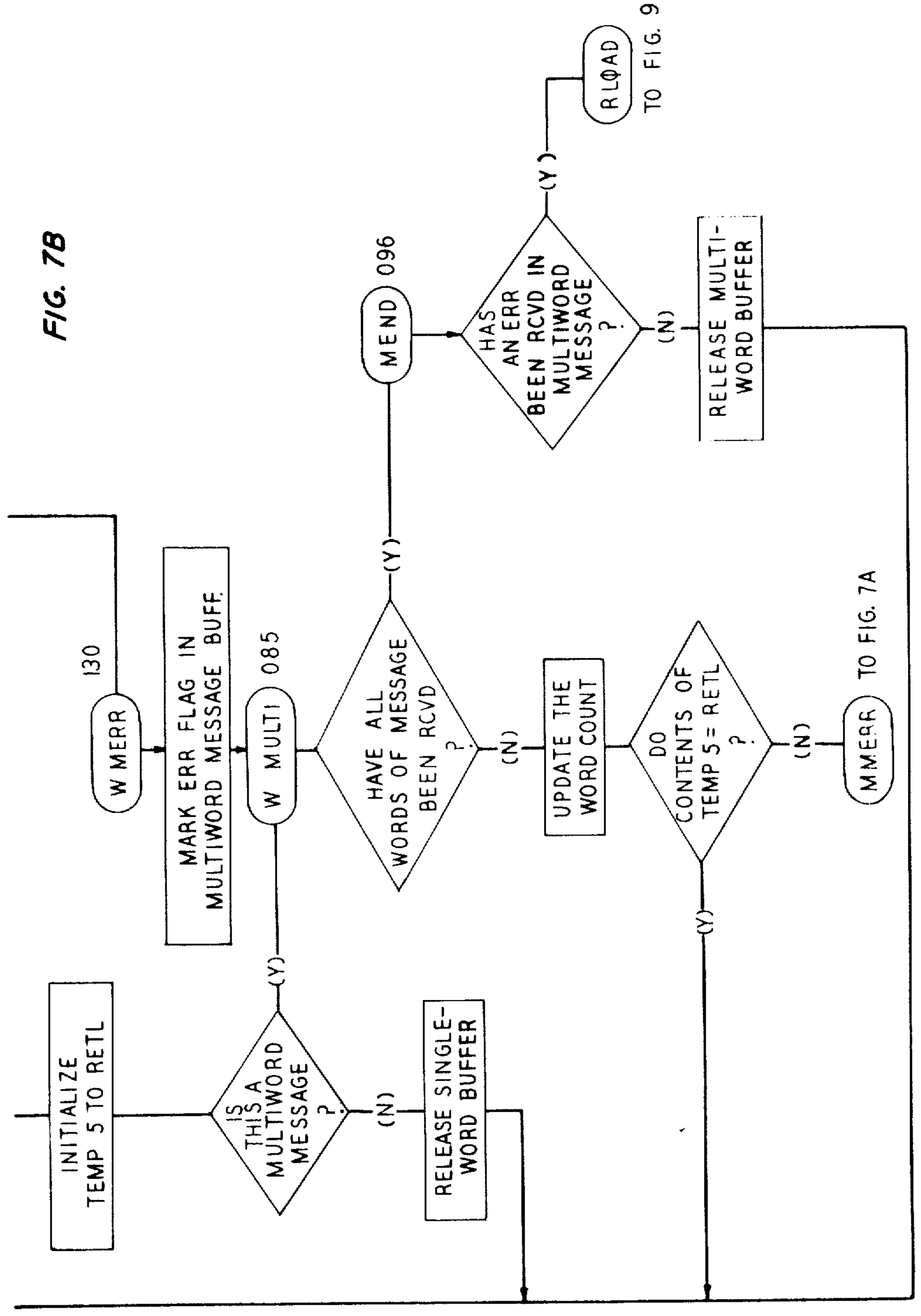
Figure 10:
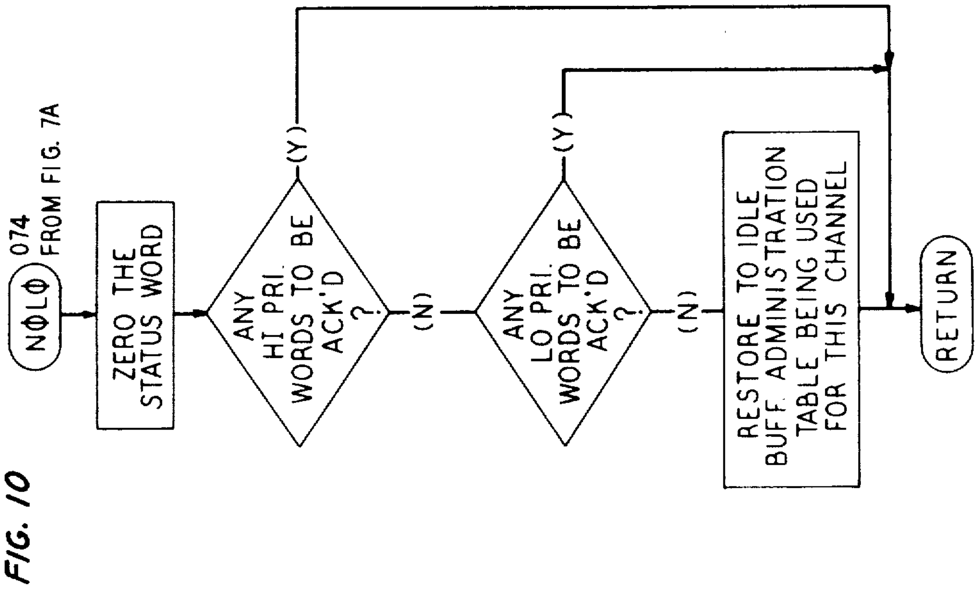

The processing of instructions 050 through 085 is shown in FIG. 7. The status word for the transmitted block is entered in the K-register. This instruction is executed after instruction 019 if instruction 019 indicates that there were no words in the current data block transmitted from the high-priority buffer.

051 MK M.STLO,K,PS

052 HC D.STLO

Instruction 051 sets the mask for the low-priority status bits of the status word for the transmitted block, FIG. 4B, into the L-register. The status word for the block in the K-register, product masked by the contents of the L-register replaces the contents of the K-register. The K-register now contains the low-priority status bits of the status word. Instruction 052 right adjusts the low-priority status bits in the K-register.

053 KM TEMP1

The low-priority status bits are saved in memory at TEMP1.

054 HPMK D.ERR,TEMP

The logical product of the error bits obtained from location TEMP and the low-priority status bits in the K-register replaces the contents of the K-register. The K-register now has the error control word for messages transmitted from the low-priority buffers.

055 HC D.ERR

The product of the low status bits and the error bits is right adjusted.

056 MMERR TZRFZ RETL

If the error control word in the K-register contains any "1's" indicating erroneous words transmitted from the low-priority buffer, the location of the rightmost "1" is entered into the F-register, the rightmost "1" in the K-register is zeroed and the next instruction 057 is executed. If the K-register contains no "1's," transfer is made to location RETL, instruction 060.

057 KM TEMP2

The updated error control word is stored in memory at location TEMP2.

058 FM TEMP3

The contents of F-register which indicates the position in the transmitted block of the first incorrect word from the low-priority buffer is stored in TEMP3.

059 WL 0,F

The contents of the F-register are moved to the L-register.

060 RETL MK TEMP1

The low-priority status bits saved in instruction 053 are now entered into the K-register.

061 TZRFZ NOLO

If there are no more low-priority status bits, i.e., "1's" in the K-register, transfer is made to NOLO (O74). If there are more words, instruction 062 is executed instead.

062 KM TEMP1

This instruction is executed if there are words left in the low-priority buffer. The status bits for the low-priority buffer are saved in memory.

063 SLR 0,F

From the position in the transmitted block of the first word that was transmitted from the low-priority buffer, which position was stored in the F-register by instruction 061, is subtracted the position of the first word transmitted in error. The latter was stored in the L-register by instruction 059. If the positions agree, the result is zero and the C-control flips are so set.

064 TCAZ MMESS

If the result of the comparison is zero, it means that the first word from the low-priority buffer was transmitted in error and transfer is made to MMESS, instruction 105. If the result is nonzero, it means that the word was correctly transmitted from the low-priority buffer and instruction 065 will be executed.

065 WB RETL

066 BM TEMP5

These instructions load RETL as the return address, for later possible use in instruction 094 or 157.

067 MZ ΓLO,Y

The acknowledgment pointer (FIG. 4A) for the low-priority message buffers is entered into the Z-register. The pointer is the address of the first, i.e., LINK word in the first low-priority message buffer which contributed a data word to the transmitted block corresponding to the BLOCK received over the common signaling channel.

068 MC 0,Z

The sign bit in the LINK word at the address indicated in the Z-register sets the C-control flip-flops. If the sign bit of the link word is "1" (FIG. 5B) it means that the word just found to be correct is part of a multiword message and transfer will be made to WMULTI, instruction 085, after instruction 069 is executed.

069 TCM WMULTI

Instruction 069 causes a transfer to instruction 085 when the C-control flip-flops are set to "minus," i.e., the sign bit was a "1."

070 ENTJ RSINGE

071 WK ΓLO,Y

Instructions 070 and 071 are executed if the single-word message was correctly transmitted. Instruction 070 will transfer control to the subroutine RSINGE (instruction 159) after executing instruction 071, which places the address of the acknowledgment pointer for low-priority messages (ΓLO plus the contents of Y) into the K-register. The J-register is set to the return address, instruction 072. The subroutine RSINGE will release the message buffer which stored the single-word message by putting it back in the idle link list for these buffers, and then will return to instruction 072.

072 ENTJ RETL

Transfer is made to RETL (instruction 060) after instruction 073 is executed.

073 ML TEMP3

The position of the next of any words in the transmitted block which were received in error is transferred from TEMP3 to the L-register. Transfer is now made to instruction 060 with this information in the L-register.

074 NOLO MZ TEMP4

The address of the status word for the transmitted block is placed into the Z-register.

075 EZEM 0,Z

This instruction zeros the word stored at the address indicated by the Z-register, i.e., the status word is zeroed.

076 MZ ΓLO,Y

This instruction places the acknowledgment pointer for the low-priority buffer into the Z-register.

077 TCAU RETURN

If the C-control flip-flop set by instruction 076 is nonzero, the ACK routine of the present invention has been completely executed and transfer is made to RETURN, a symbolic location in the main or executive control program of processing instructions being carried out by data-processing system 300. Otherwise instruction 078 is next executed.

078 MZ ΓHI,Y

The acknowledgment pointer for the high-priority buffer is placed into the Z-register. If the high-priority pointer is nonzero, signifying that more messages remain to be acknowledged, the C-control flip-flops will be set to indicate nonzero.

079 TCAU RETURN

If the sign bit of either of the low- or high-priority acknowledgment pointer is set, transfer is made to RETURN. If the sign bit is not set, instruction 080 is next executed.

080 EZEM TBCL,X

Figure 4A:
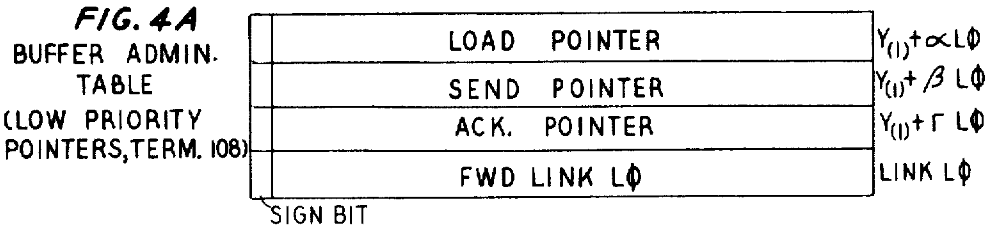
FIGS. 4A and 4C show the registers for storing the pointers which identify the location of the low- and high-priority message buffers containing the data words transmitted over the common signaling channel.
Figure 4B:
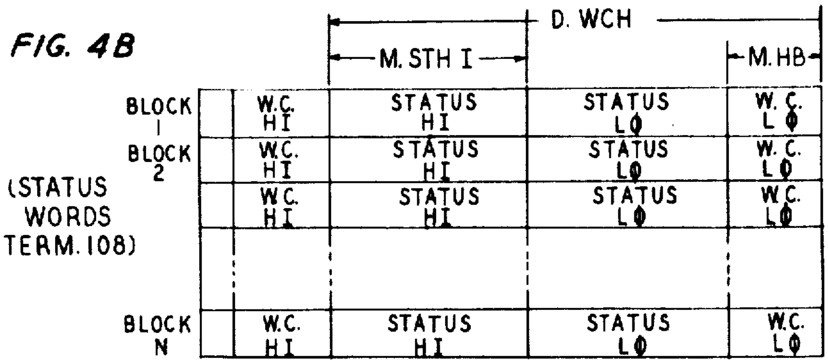
FIG. 4B shows the low- and high-priority status words for each of the transmitted blocks of information previously transmitted over a common signaling channel of FIG. 1.
Figure 4C:
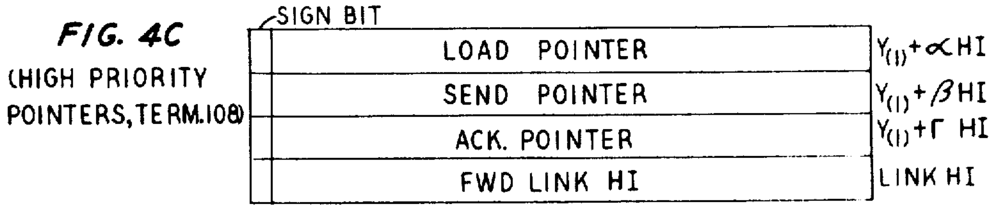

Instruction 080 zeros the contents of the word in the TBCL directory of buffer administration tables, FIG. 3D which was originally consulted in instruction 004 to obtain the address of the buffer administration table, FIGS. 4A and 4C containing the status words and the load, send and acknowledgment pointers for terminal 108.

081 MZ TBUFE

This instruction places the contents of the head cell TBUFE, FIG. 3F, for the list of available buffer administration tables into the Z-register.

082 ZM LINKHI,Y

This instruction loads the address obtained in instruction 081 into the high-priority LINK word address location given by the Y-register indexed by the parameter LINKHI. The Y-register contains at this point the address of the buffer administration table currently being processed.

083 YM TBUFE

084 T RETURN

With these instructions, the address of the buffer administration table is loaded into the head cell of the list of available buffer administration tables and processing is returned as described after the execution of instruction 077.

The following instructions are executed when it has been determined that the correctly transmitted word is part of a multiword message.

085 WMULTI MK 1,Z

Figure 5A:
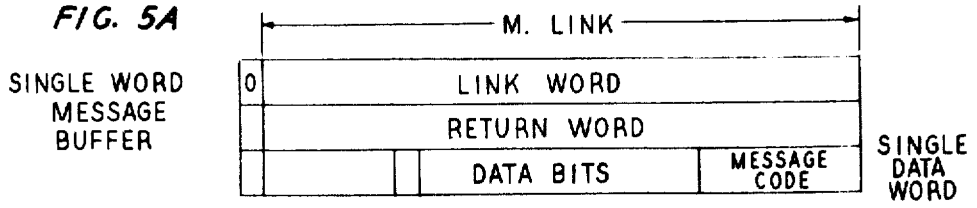
FIGS. 5A and 5B show, respectively, a single- and a multiword message buffer for storing the data words transmissible over a common signaling of FIG. 1.
Figure 5B:
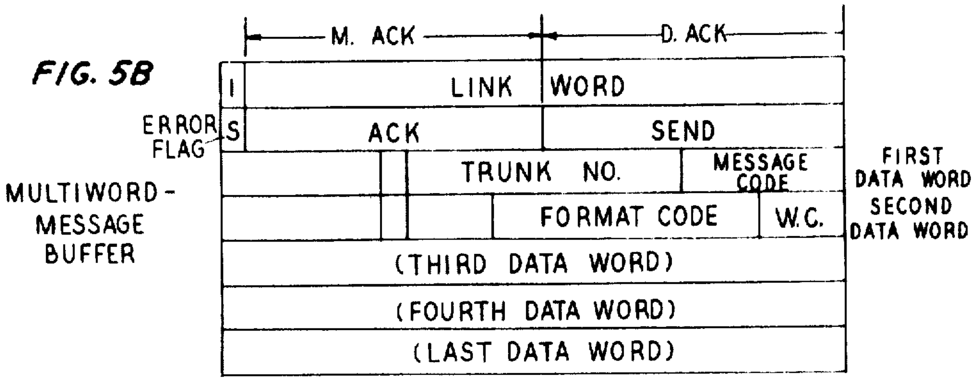

The word following the link word, i.e., the second word in the transmitter buffer, FIG. 5B, is entered into the K-register by adding 1 to the address obtained from the Z register.

086 H 1

Figure 8:
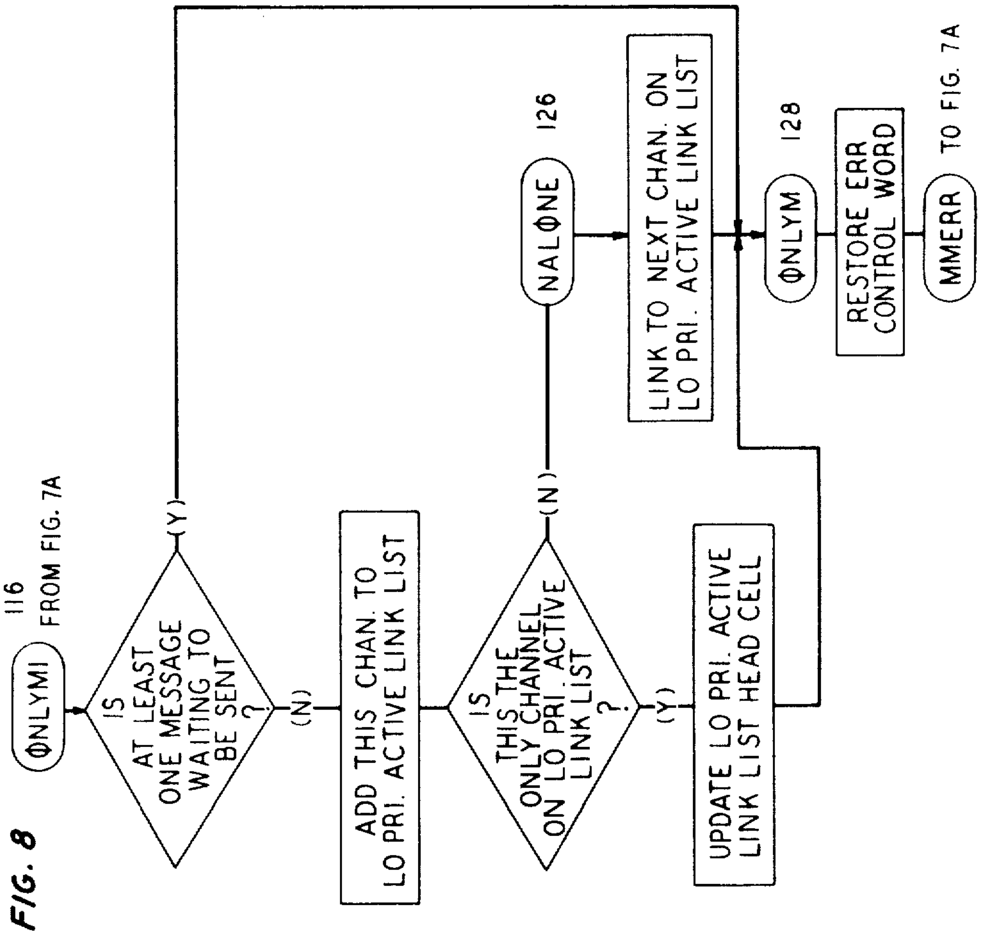
Figure 9:
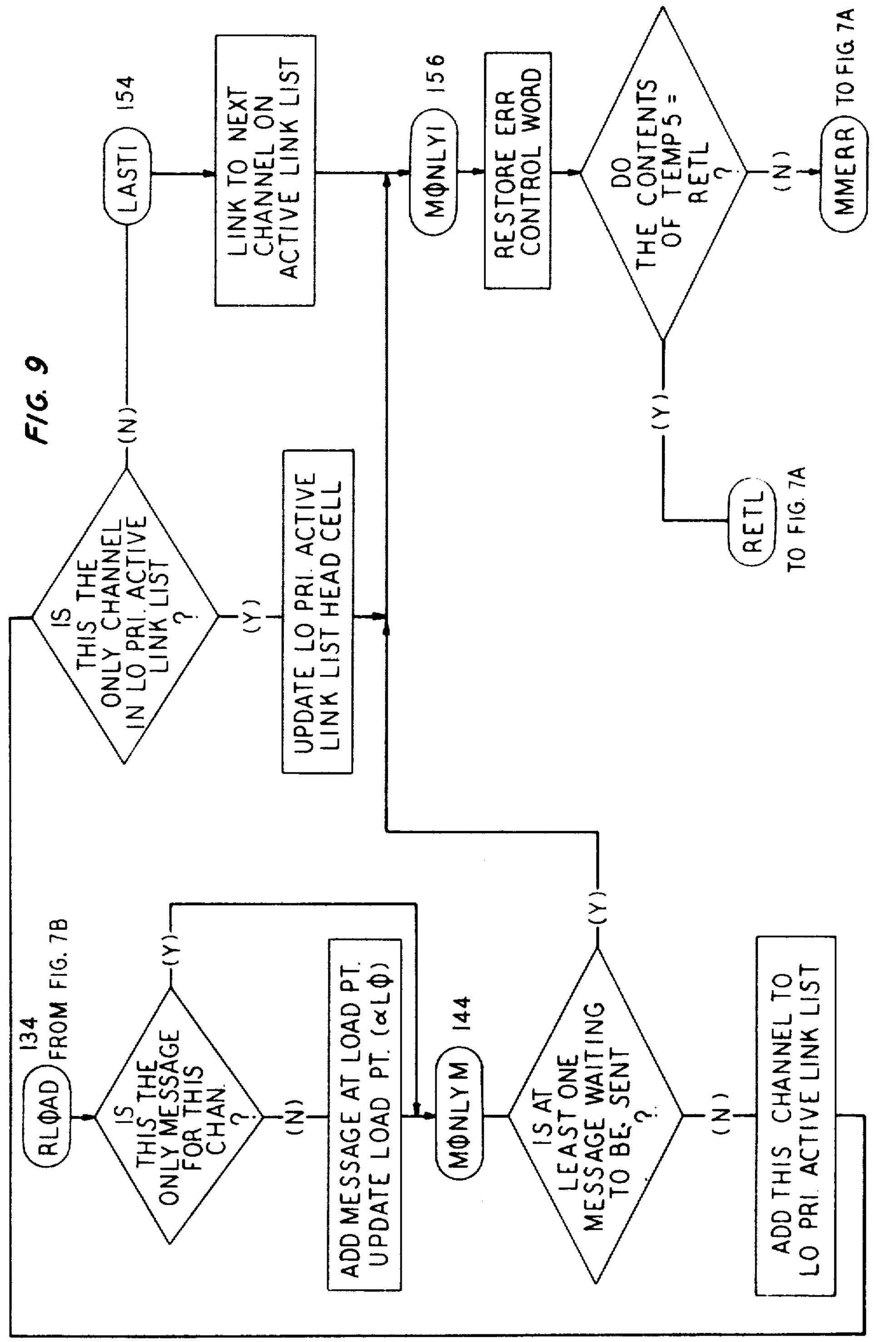

The processing of instructions 086 through 132 and 134 through 143 is shown in FIG. 8. The second word from the transmitter buffer is shifted to the left one bit position in the K-register to eliminate the sign bit.

087 H −D.ACK−1

088 WL M.WC

The contents of the K-register is right-adjusted by the amount specified by D.ACK+1 so that the ACK Field occupies the rightmost position. The mask, M.WC for reading the word count is entered into the L-register. In the format of the multiword message buffer shown in FIG. 5B, the word following the LINK word contains three fields. The "SEND" field occupies the least significant bits of the word and is employed during the execution of the SEND routine to store the position in this buffer of the next data word to be sent to the transmitter 108–2, FIG. 1. The next field, "ACK," is employed as a counter to indicate how many words in this message buffer have been acknowledged. The third field is the sign bit 22 which if set to "1" indicates that multiword message buffer has a word which was incorrectly transmitted.

089 AWK 1

The ACK field is incremented by "1" to indicate that another word of the multiword message has been verified.

090 CMK 3,Z,PL

The word in memory located three words after the address in the Z-register, i.e., three words after the LINK word, product masked by the word count bits in the L-register is subtracted from the contents of the K-register. The C-control flip-flops are set by the result of the difference remaining in the K-register.

091 TCGE MEND

Transfer is made to the routine MEND, instruction 096, which releases the multiword message if the current state of the C-control flip-flops is greater than or equal to arithmetic zero. This will occur if the comparison of the field count in the word count W.C. and the count in the ACK field indicates that all the words of the message have been verified as having been correctly received. If the comparison is negative, however, instruction 092 is executed.

092 HMB D.ACK,1,ZA

The ACK bits in the K-register are reshifted so that they will occupy the proper position when, in instruction 093, they are returned to the second word of the multiword message buffer. The Z-register has the address of the LINK or first word of the multiword message buffer. ZA is this address plus 1 or the address of the second word in the multiword message buffer. The message presently in the second word of the multiword message buffer is entered into the B-register.

093 KM M.ACK,Z,ES

This instruction places the mask "M.ACK" into the L-register, replaces those bits of the B-register indicated by the presence of "1's" in corresponding positions of the L-register with the contents of corresponding bit positions of the K-register, and stores the result at the address indicated by the Z-register. Thus, the ACK field bits of the word in the B-register are updated by the contents of the K-register and then rewritten in the second word of the multiword message buffer.

094 ENTJ TEMP5,M

Transfer is made to the contents of location TEMP5, which contains either MMERR (Instruction 056) or RETL (Instruction 060) after the next instruction is executed.

095 ML TEMP3

This instruction restores to the L-register the bits which indicate the position in the transmitted block of the next if any remaining erroneous words so that instruction 060 may be repeated with an updated contents in the L-register.

The following instruction 096 is executed when instruction 091 indicates that all the words of a multiword message have been verified. As a precaution, however, the sign of the second word of the multiword block is checked in instruction 096 to see if the second word in the multiword message buffer has been marked as containing a word in error.

096 MEND MC 1,Z
097 TCM RLOAD

Instruction 066 reads the sign bit of the second word and if the sign bit is "1" indicating that a message in the multiword buffer was received in error, instruction 097 will transfer control to RLOAD, instruction 134, which will reload the message for later retransmission.

098 ML 0,Z

This instruction is executed if the message was received correctly and, when executed, puts the LINK word into the L-register. The LINK word is the address of the next single or multiword message buffer serving the common signaling channel.

099 LM $\Gamma$LO,Y

This instruction puts the LINK word into the acknowledgment pointer. With the updating of the acknowledgment pointer by the execution of this instruction, the list of messages to be acknowledged has been "closed up" after removing from the list one multiword message which has been completely verified.

100 ML MULTE

This instruction places the contents of the head cell MULTE, FIG. 3F, into the L-register. MULTE is the head cell of a linked list of addresses of message buffers whose contents have all been verified.

101 ZM MULTE

This instruction places the address of the multiword message buffer whose data words have all just been verified into the head cell MULTE.

102 LM 0,Z

The address that was placed in the L-register in instruction 100 is stored in the link word of the message buffer whose address is indicated in the Z-register.

103 ENTJ RETL
104 ML TEMP3

Instruction 103 returns control to RETL instruction 060 after instruction 104 is executed. Instruction 014 restores to the L-register the bits which indicate the position of the next of any words in the transmitted block which are in error.

The following instructions are executed when the execution of instruction 064 indicates that a message transmitted from a low-priority buffer is in error. A check must now be made to determine if the message was a single- or a multiword message.

105 MMESS MZ $\Gamma$LO,Y

This instruction is entered from instruction 064 and reads the acknowledgement pointer for the low-priority message buffers into the Z-register. The pointer is the address of the first or LINK word in the first low-priority message buffer for the common signaling channel being served by 300.

106 WB MMERR
107 BM TEMP5

These instructions load MMERR as the return address for later possible use in instrciton 094 or 157.

108 MC 0,Z

Using the contents of the Z-register as an address, the LINK word is obtained and placed into the B-register and the C-control flip-flops are set by the sign bit 22 of the LINK word.

109 TCM WMERR

If the sign bit of the LINK word for this message is a "1," this is a multiword message and transfer will be made to location WMERR, instruction 130.

110 TRAZ ONLYM1,B

Instruction 110 is executed when instruction 109 reveals that the erroneous word was a single-word message. If the C-control flip-flops were set to arithmetic zero when instruction 108 was executed, it means that the entire LINK word in the single-word message buffer was zero and that, accordingly, the single-word message buffer is the last low-priority buffer for the common signaling channel presently being served by processor 300. If this is the last message buffer, transfer is made to ONLYM1, instruction 116.

111 BM $\Gamma$LO,Y This instruction is executed if the LINK word in the message buffer is not zero. The LINK word is loaded into the acknowledgement pointer, FIG. 4A. The acknowledgment pointer is the address of the next message buffer serving the common signaling channel at terminal 108.

112 EZEM 0,Z

This instruction zeros the old LINK word, i.e., the first word of the message buffer holding the data word found in error, and, in so doing, removes the message buffer from the linked list of buffers awaiting verification of their data words.

113 MF $\alpha$LO,Y

This instruction reads the load pointer for the low-priority buffers into the F-register. The load pointer is the address of the first or LINK word of a message buffer whose contents is to be retransmitted over the common signaling channel.

114 ZM 0,F

This instruction places the contents of the Z-register, i.e., the address of the single-word message buffer containing the erroneous word, into the LINK word indicated by the load pointer in the F-register.

115 ZM $\alpha$LO,Y

This instruction places the address of the message buffer containing the erroneous word into the load pointer FIG. 4A. The single-word message has now been reloaded into a message buffer in the list of message buffers containing data words which are to be retransmitted over the common signaling channel.

116 ONLYM1 MF $\beta$LO,Y

The contents of the low-priority SEND pointer are placed in the F-register. The C-control flip-flops will indicate whether or not the SEND pointer was set to zero.

117 TCAU ONLYM

If the SEND Pointer is not set to zero signifying that at least one message is currently awaiting transmission, then a transfer will be made to location ONLYM (instruction 128). On the other hand, if the SEND pointer is set to zero, it is necessary to initialize the SEND pointer and link this buffer administration block to the low-priority active linked list to insure the retransmission of the message found to contain an error.

118 ZM βLO,Y

The LINK word address of the message buffer containing the message to be retransmitted is inserted into the low-priority SEND pointer.

119 EZEM LINKLO,Y

The forward link word is zeroed, signifying that this buffer is now at the end of the list.

120 WF LINKHI,Y

The high-priority forward LINK word address (see FIG. 4C) is placed in the F-register.

121 MK LACT+1

The contents of the second word of the head cell for the low-priority active linked list (FIG. 3F) of buffer administration blocks is placed in the K-register. The memory location LACT+1 contains the low-priority forward link address of the last buffer administration block on the low-priority linked list, and the location LACT contains the forward link address of the first buffer administration block on the list. The head cell is used by the SEND routine to locate and transfer messages to the transmitter. If the contents of LACT+1 is zero, then the list is empty.

122 TKAU NALONE

The transfer to NALONE (instruction 126) is made if the active list is not empty.

123 FM LACT

The low-priority link word address for the buffer administration block being processed is loaded into the first word of the low-priority active linked list head cell.

124 FM LACT+1

The same address is loaded into the second word of the head cell, implying that his buffer administration block is the only one on the list.

125 T ONLYM

THe program transfers to ONLYM (instruction 128).

126 NALONE FM 0,K

Location NALONE is entered from instruction 122 if at least one other buffer administration block is linked to the high-priority active linked list. Instruction 126 moves the forward link address of this buffer administration block into the forward link address of the former last member on the high-priority active linked list.

127 FM LACT+1

Instruction 127 loads the forward link address into the second word of the active head cell, thereby recording the identity of the new last member on the list.

128 ONLYM ENTJ MMERR

129 MK TEMP2

Instruction 128 transfers control to MMERR, instruction 156, after instruction 129 is executed. Instruction 129 restores the error control word which was updated in instruction 057 to the K-register.

The following instructions are executed when instruction 109 has determined that one word of a multiword message is in error.

130 WMERR MK 1,Z

This instruction places the contents of the word in the multiword message buffer following the LINK word into the K-register. The address of the LINK word is in the Z-register.

131 UWK E.22

This instruction sets bit 22 of the data word in the K-register to "1" to indicate that the message in this register was reported in error. The following two instructions cause a transfer to instruction 085 and set the sign bit as an error flag in the second word of the multiword message buffer.

132 ENTJ WMULTI

133 KM 1,Z

134 RLOAD MC M.LINK,Z,PS

The C-control flip-flop is set to zero if this is the lower 22 bits are zero.

135 TCAZ MONLYM

This instruction causes transfer to the symbolic location MONLYM, instruction 144, if the LINK word is zero, indicating that there are no other low-priority message buffers linked to this buffer administration block.

136 ML 0,Z

This instruction is executed when nonzero data is detected in the LINK word indicating that the message buffer is linked to another message buffer. This instruction enters the contents of the LINK word into the L-register. The L-register is thus given the address of the next message buffer serving this common signaling channel.

137 LM ΓLO,Y

This instruction transfers the LINK word from the L-register into the acknowledgment pointer of the low-priority buffer administration table FIG. 4A. The acknowledgment pointer is thereby updated to indicate the address of the next message buffer awaiting acknowledgment processing.

138 MK αLO,Y

The load pointer presently stored in the low-priority buffer administration table FIG. 4A is entered into the K-register. The load pointer is the address of the first or LINK word of the last low-priority message buffer linked to this buffer administration block. Therefore, when this instruction is executed, the K-register is given the LINK word address of the last buffer on the list of buffers in which words awaiting transmission are placed.

139 MB 0,K

140 ZM M.LINK,K,ES

The address (in the Z-register) of the LINK word of the multiword message buffer containing a message in error is stored in the LINK word of the message buffer whose address is indicated by the contents of the K-register. Instruction 139 and the mask M.LINK, FIG. 5A, prevent the sign bit in the first word of the message buffer from being changed. The former last message buffer on the list now has an updated address in its LINK word.

141 ZM αLO,Y

The address of the multiword message buffer containing an erroneous message is entered into the load pointer of the low-priority buffer administration table, FIG. 4A.

142 MB E.22,Z,PS

143 BM 0,Z

The LINK word of the multiword message buffer whose contents is being reloaded is zeroed except for the sign bit. The sign bit is not zeroed since the message buffer still contains a multiword message.

144 MONLYM MC βLO,Y

The send pointer is read into the B-register, and will set the C-control flip-flops to zero if the pointer is zero, which indicates that there are no messages currently being sent.

145 TCAU MONLY1

Transfer to MONLY1 if the send list already had at least one message on it, for then it is not necessary to add this message. If there are no messages already loaded to be sent, go on to instruction 146.

146 ZM βLO,Y

The address of the message which must be resent is in the Z-register, and is now loaded into the send pointer.

147 EZEM LINKLO,Y

Location LINKLO,Y which is the link address for this channel's low-priority send list is zeroed, to mark the end of the link list.

148 WL LINKLO,Y

The address of this channel's low-priority link is loaded in the L-register, for use in instruction 151 and 152.

149 MK LACT+1

The low-priority link list head cell, second word, is read into the K-register.

150 TCAU LAST1

A transfer is made to LAST1 (instruction 154) if the low-priority link list already has an entry on it, in which case the second word of the head cell will be nonzero.

151 LM LACT

152 LM LACT+1

Instructions 151 and 152 are executed if this channel is the only one on the link list. The address of this channel's link word is placed into both words of the link list head cell.

153 T MONLY1

A transfer is made to MONLY1 (instruction 156).

154 LAST1 LM 0,K

155 LM LACT+1

The address of this channel's link word is placed onto the end of the list (instruction 154) and also into the second word of the head cell (instruction 155).

156 MONLY1 EZEM 1,Z

The second word of the multiword message buffer is zeroed, to initialize for the next transmission of this message.

157 ENTJ TEMP5,M

158 MK TEMP2

A transfer is made to the contents of location TEMP5, which contains either MMERR (instruction 056) or MMERR (instruction 056) after the error control word is restored to the K-register. The search for more error bits will continue.

The following instructions 159 through 164 release single word message buffers. These instructions are entered with the Z-register containing the address of the message buffer containing the single-word message to be released and with the K-register containing the address of the acknowledgment pointer of the buffer administration table for the particular channel that is to be linked.

159 RSINGE ML SINGE

When this instruction is executed the contents of the head cell SINGE is entered into the L-register. SINGE is the symbolic name for a head cell, FIG. 3F, for the list of single-word message buffers which have been successfully acknowledged. This list is advantageously consulted during the running of base level programs (not herein described) one of which unloads the list. Of course, the list could be unloaded as part of the interrupt level acknowledgement program, but it would ordinarily not be advantageous to increase the running time of the acknowledgment program by this type of routine work when sufficient memory capacity is provided in call store 103. Since the details of the program for unloading such lists are not essential to an understanding of the invention they are omitted herefrom.

160 ZM SINGE

This instruction loads into the head cell SINGE the LINK word address of the single-word message buffer which is to be added to the list of buffers that have been successfully acknowledged.

161 MB 0,Z

This instruction places the LINK word from the single-word message buffer into buffer register B. As previously mentioned, the LINK word is the address of the next message buffer serving the particular channel.

162 BM 0,K

This instruction transfers the LINK word from buffer register B into the acknowledgment pointer at the appropriate location in the buffer administration table.

163 LM 0,Z

The contents of the L-register, i.e., the information from head cell SINGE, is stored in the LINK word of the single-word message buffer. When the base level unloading program unloads the single-word message buffer, it will use the information in the first word of the message buffer to find the location of the next message buffer to be unloaded.

164 T 0,J

Return is made to the routine which transferred here (instruction 026 or 072) which address was stored in the J-register at instruction 024 or 070.

The above instructions 001 through 164 are the instructions of the illustrative processing routine for acknowledging messages transmitted from one of the terminals such as terminal 108 in response to the return of a BLOCK word over the respective common signaling channel to the terminal. It was mentioned above that in addition to the acknowledgment routine comprising the present invention, the local office data-processing system 300 would make use of routines for loading messages into storage for transmission by the terminal and for communication with the terminal to effect the actual transmission of such data word messages from storage. The LOAD and SEND routines hereinafter described in the appendix are examples of routines which have been designed to perform these functions with a plurality of common signaling channels.

APPENDIX

```
↓  Location        Operation         DA, RM, LCJ       Comments
1  2          7 8  9           16 17 18                                                    72
*                                    Assume:
*                                                      1. Channel number is in ARG1
*                                                      2. Priority is ARG2
*                                                         ARG2=0 indicates high priority
*                                                         ARG2≠0 indicates low priority
*                                                         ARG2=n indicates n-word message for n-1,2, . . .
*                                                         3. The contents of the Y register=the address of information to
*                                                            be stored.
*
*                                    Check if a buffer exists
   LOAD            MX                ARG1              Channel number
                   MKMZ              TBCL,X            K,Z=address of transmitter buffer if any
*                  TKAU              TEST              A buffer exists
*
                                     Seize a buffer, update links
                   MKMZ              TBUFE             TBUFE head cell of available transmitter buffers
                   TKAZ              ERROR             No buffers left
                   BM                TBCL,X            Store buffer address in channel head cell
                   MB                O,B               Update TBUFE. Take buffer
                   BM                TBUFE               off linked list.
                                     Initialize buffer mainly a transmitter buffer should be zeroed before use.
                   EZEM              0,Z               α for low-priority buffer (load pointer)
                   BZEM              1,Z               β for low-priority buffer (transmit pointer)
                   EZEM              2,Z               γ =acknowledgment pointer (low priority)
                   EZEM              3,Z               One way link for low-priority messages
                   XM                4,Z               Channel number
                   EZEM              5,Z               Status words
                   EZEM              6,Z                    Do.
                   EZEM              7,Z                    Do.
                   EZEM              8,Z                    Do.
                   EZEM              9,Z                    Do.
                   EZEM              10,Z                   Do.
                   EZEM              11,Z                   Do.
                   EZEM              12,Z                   Do.
                   EZEM              13,Z              α for high priority load pointer
                   EZEM              14,Z              β =transmit pointer for high-priority buffer
                   EZEM              15,Z              γ =acknowledgment pointer for high-priority buffer
*                  EZEM              16,Z              One-way link for high-priority messages
*
*                                    Check what type of message we have (high or low priority)
   TEST            MF                ARG2,,C           F=Complement of word count
                   TCAZ              HIPRL             High-priority message
```

APPENDIX—Continued

```
↓  Location        Operation          DA, RM, LCJ            Comments
1  2          7 8  9            16 17 18                                                  72

                   MX                 Message is low priority, link through low-priority list
                   TCAU               O,Z                    Has low priority been used a low priority=0?
                                      USED                   There are already some entries in low-priority list
                                      First use of low priority for this channel
                   MX                 LOPRHC+1               Check if buffer is on low-priority active list
                   TCAZ               FSTLST                 First active low-priority buffer
                   KM                 3,X                    Link new buffer on active list
                   KM                 LOPRHC+1               Make it last

                                      Check if we have a one word message
   USED            CWR                -1,F                   Is it one word message
                   TCAZ               SMESS                  Yes, message is single word
                                      Multiword message, seize a multiword block
                                      This should be done only if the call register is not to be used. Prefer use of call register

                   MK                 MULTE                  Seize multiword block
                   TKAZ                   ERROR              No multiword message blocks
                   MB                 O,K                    }
                   BM                 MULTE                  }Update links
                                      Link to α
                   MX                 O,Z                    Get address of last message if any=α
                   TCAZ               FST                    We are loading first message
                   ML                 1,Z                    Get transmit pointer
                   TCAU               CONT                   Transmit pointer is pointing to message
   CONT            KM                 1,X                    Update both α and β
                   KM                 O,X
                   KM                 O,Z                    Contents of the X register=new message
                                      Copy the information into the new message block seized. Y=address of information
                                        to be copied
   STORE           MB                 F=Contents of word count, K=block address
                   BM                 O,YA
                                      3,KA                   3 indicates we need three control words
                                                             Word 1=link
                                                             Word 2=where to transmit after message is acknowledged
                                                             Word 3=pointer within block to use for transmitting information
                   WF                 O,FA                   Check if end of message
                   TCLU               STORE                  Copy more information
                   ENTJ               O,J                    Return
                   EE                                        May be used for something
                                      This is the first message (low priority) for the transmitter buffer. Set all the
                                        pointers α, β, γ to its address
   FST             KM                 O,Z                    Store message address in α
                   KM                 1,Z                                             β
                   KM                 2,Z                                             γ
                   T                  STORE

                                      The message is a single work message (low priority)
                                      Seize a three-word block
   SMESS           MK                 SINGE                  Head cell of three-word blocks
                   TKAZ                   ERROR              No storage available
                   MB                 O,K
                   BM                 SINGE
                                      From hereon is about the same as for multiword messages
                   MX                 O,Z                    Get α
                   TCAZ               FST1                   First message
                   ML                 1,Z                    Test if register B=O
                   TCAU               CONT1
   CONT1           KM                 1,X
                   KM                 O,X
                   KM                 O,Z
                                      Store information
   STORE1          MB                 O,Y

                   ENTJ               O,J
                   BM                 2,K

   FST1            KM                 O,Z
                   KM                 1,Z
                   KM                 2,Z
                   T                  STORE1                 (Can repeat "STORE1" to avoid)
                                      This is the only low-priority transmitter buffer on the busy list
   FSTLST          KM                 LOPRHC                 Store its address in a low-priority busy buffer head cell
                   KM                 LOPRHC+1               Store also in last
                   T                  USED

                                      High priority messages are handled same as single word messages low priority
                                      The transmitter high priority busy list head cells are "HIPRHC" and "HIPRHC+1"
   HIPRL                                                     ALHI=αHI=13,HILNK=16
                   MX                 ALHI,Z
                   TCAU               HUSED
                   MX                 HPRHC+1
                   TCAZ               FSTH
                   KM                 HILNK,Z                Forward link
                   KM                 HPRHC+1
   HUSED           MK                 SINGE                  Seize a three-word block
                   TKAZ               ERROR
                   MB                 O,K
                   BM                 SINGE
                   MX                 ALHI,Z
                   TCAZ               FSTH1
                   ML                 ALHI+1,Z               β high-priority message buffer = transmitter pointer
                   TCAU               CONTH
   CONTH           KM                 1,X
                   KM                 O,X
                   KM                 ALHI,Z
   STORE2          MB                 O,Y
                   ENTJ               O,J
                   BM                 2,K                    Store information

                                      First message in buffer
                                        (high)
   FSTH1           KM                 ALHI,Z                 α
                   KM                 ALHI+1,Z               β
                   KM                 ALHI+2,Z               γ
```

APPENDIX - Continued

```
Location         Operation            DA, RM, LCJ          Comments
1 2          7 8 9                16 17 18                                                                72

FSTH             KM                   HIPRHC
                 KM                   HIPRHC+1
                                      The SEND routine checks the high priority list and then the low-priority lists.
                                      From every active transmitter buffer, an attempt is made to send one word. This
                                        word is either accepted or not by the transmitter. This can be determined by
                                        checking the contents of the L register. If the contents of the L register = 0
                                        message was not transmitted, otherwise it was.

                                      NOC = number of channels

SEND             MKMY                 HIPRHC               Get first transmitter buffer on high priority list
                 TKAZ                 NEXT                 No high priority messages, go to low priority. To imitate scanner
                                                             orders, set index reg. Z to the address of routine for processing
                                                             high-priority messages
                 WZ                   PROC
RET              MX                   ALHI+1,K             X = address of first message to transmit
                 MK                   4,K                  Common signaling channel number
                 MF                   TBCL+NOC,K           Enable to register F
                 MAS                  2X                   Send one word message
                 TAUMK                ALHI+3,Y             K = next transmitter buffer
                 YM                   PREV
                 WY                   O,K
                 TKAU                 RET                  Next ≠ indicates another buffer on list. End of high priority
                                                             active lists, send low-priority message.
NEXT             MKMY                 LOPRHC
                 TKAZ                 OUT                  END OF SCAN
RET2             WZ                   PROC1                Set up low processing routine
RET1             MX                   1,K                  X=Send pointer (B) of low-priority list
                 MC                   O,X                  Is sign—indicates multiword message
                 TCM                  MULTI                We are sending out of multiword message
                                      A single word message, send out data word and update pointers
                 MK                   4,K                  Get common signaling channel number
                 MF                   TBCL+NOC,K           Enable address to F
                 MAS                  2,X
                 TAUMK                3,Y
                 YM                   PREV
                 WY                   O,K
                 TKAU                 RET1
OUT                                                        END OF SCAN, RETURN

                                      Send one word out of a multiword message
                                      K,Y=                 Address of transmitter buffer
                                      X=                   Send pointer (B). M.WC is the mask for the word count
MULTI            WZ                   PROC2
                 WK                   M.WC,X,S             K=Send pointer
                 AMK                  3,X,PL               K=send pointer and word count
                 AMK                  2,X                  Add complementary of word count
                 MB                   4,Y                  Common signaling channel number to the B register
                 MF                   TBCL+NOC,B           Enable to F
                 MAS                  O,K                  Send word
                 TAUMK                3,Y
                 YM                   PREV
                 WY                   O,K
                 TKAU                 RET1                 Try and send more
                 RETURN                                    END OF SCAN
                                      M.BPOS=Ø7760
                                      Process multiword message, update status words PROC2 block word set by terminal
                                      Block word is in the L register
PROC2            WZ                   M.BLK,,PL
                 AYR                  O,Z                  Z=start of buffer and block number
                 WK                   M.BPOS,,PL           Position of word, 8 bit ring counter
                 HUMK                 H.LP,5,Z             H.LP=0.1
                 AWK                  1                    Increment word count for low priority
                 KM                   5,Z                  Store updated status word.

                                      Did we send the last word of a multiword message
                 MF                   2, X
                 AWF                  1
                 TRAZ                 OUTM, F              END OF MULTIWORD MESSAGE
                 FM                   2, X                 Contents is number of words expected
                 ENTJ                 O, J
                 MK                   3, Y                 RETURN

                                      End of multiword message, update send links
OUTM             MX                   O, X
                 XM                   1, Y                 1,Y=B=transmit pointer
                 TCAZ                 OUTL                 No more low priority message to transmit
                 ENTJ                 O, J
                 MK                   3, Y
                                      No more messages, take out of low priority link list LOPRHC
OUTL             WK                   O, Y                 Buffer address
                 CMK                  LOPRHC+1             Is it last
                 TCAU                 NOTL+1               Not last
                                      Update high priority send pointer and status word. Assumes single word message
PROC             WZ                   M. BLK,, PL          Z=block number
                 AYR                  O, Z                 Z=start of buffer and block number
                 WK                   M. BPOS,, PL         Position of word
                 HUMK                 H. HP, 5, Z          H. HP= -7
                 AWK                  E. 20                Add 1 to number of high-priority words
                 KM                   5, Z
                 MX                   O, X                 Update send pointer for
                 XM                   ALHI+1, Y            high-priority messages.
                 TCAZ                 OUTH                 No more high-priority messages get off link
                 ENTJ                 O, J
                 MK                   ALHI+3, Y            Set K register for next transmitter buffer.

                                      Take buffer out of high priority linked list
                                      "HIPRHC"
OUTH             WK                   O, Y                 Buffer address
                 CMK                  HIPRHC+1             Is it last
                 TCAU                 NOTL                 Not last
                 CMK                  HIPRHC               Is it first
```

APPENDIX—Continued

| ↓ 1 | Location 2 7 8 | Operation 9 16 17 | DA, RM, LCJ 18 | Comments 72 |
|---|---|---|---|---|
| | | TCAU | LAST | Last, not first |
| * | | | First and last | |
| | | EZEM | HIPRHC | First and last |
| | | EZEM | HIPRHC+1 | |
| * | | | Return to low-priority processing. | |
| | TESTH | ENTJ | NEXT+1 | |
| | | WZ | PROC1 | |
| | LAST | MX | PREV | |
| | | ENTJ | TESTH | this expands to {WZ PROC1; ENTJ NEXT+1; XM HIPRHC+1} |
| | | XM | HIPRHC+1 | |
| * | | | | |
| * | | | Not last. Is it first buffer in the list | |
| | NOTL | CMK | HIPRHC | |
| | | TCAU | NFTLST | |
| | | MK | ALHI+2K | First, not last |
| | | KM | HIPRHC | |
| | | ENTJ | NEXT+1 | same as TESTH |
| | | WZ | PROC1 | |
| * | | | | |
| * | | | The message buffer for the channel is somewhere in the middle of the list | |
| * | | | | |
| | NFTLST | MX | PREV | |
| | | KM | ALHI+3,X | |
| | | ENTJ | NEXT+1 | |
| | | WZ | PROC1 | |

*Note: Proc. A single word low-priority message is the same as high priority message.

It is to be understood that the above-described arrangements are illustrative of the applications of the principles of the invention. It will be apparent to those skilled in the art that other apparatus than that disclosed in the instant application may be employed. For example, the division of responsibilities between the terminal 108 and the local office data-processing system 300 may be altered so that the local office data-processing system assumes some of the functions described in the specification as being performed by the terminal. Similarly, the type of processor described in FIG. 2 may be replaced by other types of processors, in which case it may become necessary to replace those instructions such as 061 which employ the TZRFZ operation code with a series of instructions capable of being executed by such a replacement processor. Of course, it is to be understood that a special purpose wired-logic machine could be constructed to perform the specific operations disclosed herein. Numerous other modifications may similarly be devised by those skilled in the art without departing from the spirit and scope of the invention disclosed herein.

What is claimed is:

1. In a data transmission system having a signaling channel for continuously transmitting blocks of information including single or multiword data messages, idle words when there are insufficient data words available, and an acknowledgment word for identifying the position of any erroneous words in a previously transmitted one of said blocks, a method for controlling the retransmission from storage of the words of any previously transmitted data message comprising accessing a status word containing an ordered representation of bits indicating which word positions in each transmitted block were contributed by respective ones of said message buffers and which word positions were idle words, comparing the bit positions of said acknowledgment word with the bit positions in said accessed status word to derive an indication of which positions indicated by said acknowledgment word as being erroneous were actual data words contributed by one of said message buffers, controlling the retransmission from the contributing one of said message buffers of said integral message which included said erroneous data word and the release of said message buffers which contributed any remaining integral messages to said transmitted block.

2. In a data transmission system according to claim 1 the method wherein said acknowledgment word includes a bit of binary value "1" in a position corresponding to the position of any erroneous word in a previously transmitted block, wherein said comparing of said bit positions compares the rightmost "1" bit in said acknowledgment word with a rightmost bit in said status word, and wherein said controlling of said retransmission includes entering the address of said message buffer corresponding to said rightmost bit of said status word in a list of messages to be transmitted when said rightmost status word bit and said rightmost acknowledgment word bit agree.

3. In a data transmission system having a signal channel for continuously transmitting blocks of information including data words or idle words and an acknowledgment word for indicating the position of any incorrect word in a previously transmitted one of said blocks, a method of correcting erroneously transmitted messages including multiword messages whose integrity may have been interrupted in transmission by the injection of an unrelated single-word message, comprising storing all of the words constituting an integral data word message in a respective message buffer at a transmitting end of said signal channel, storing any of such unrelated singe-word messages in respective buffers, storing a plurality of status words corresponding to said transmitted blocks, each of said status words having a bit of predetermined value in a bit position corresponding to a word position in said transmitted block contributed by a respective one of said message buffers, comparing said acknowledgment word and said status word corresponding to a given one of said transmitted blocks, and retransmitting from corresponding ones of said message buffers only said messages indicated by said comparison as having included an erroneous data word.

4. In a data transmission system having a plurality of signaling channels, each said signaling channel being a duplex channel for transmitting data information pertaining to an associated plurality of communication trunks, each said signaling channel being adapted to continuously transmit blocks of information including single- or multiword data messages, idle words when there are no data words available pertaining to any of said associated trunks, and an acknowledgment word for indicating the position in a previously transmitted one of said blocks of any erroneously transmitted words, a method for controlling a local data-processing system to regulate the retransmission of any data message incorrectly transmitted over said channels comprising entering in an interface register the acknowledgment word pertaining to a block of information transmitted over a respective one of said channels, storing in one of a plurality of message buffers pertaining to a respective one of said channels all of the data words comprising any integral data word message included in said transmitted blocks, storing in an administration table for each said channel the addresses of the one of said message buffers containing, respectively, the next message to be transmitted and of the next message to be acknowledged, a status word containing an ordered representation of bits indicating which word positions in a corresponding previously transmitted block were contributed by a respective one of said message buffers and which word positions were idle words, obtaining said status word for a transmitted information block corresponding to an acknowledgment word entered in said interface register, comparing said obtained status word and said acknowledgment word to derive an indication of which positions indicated by said acknowledgment word as being erroneous were actual data words contributed by one of said message buffers, and controlling the retransmission of said integral message including said erroneous data word from the contributing one of said message buffers and releasing said message buffers which contributed any remaining integral messages to said transmitted block.

5. In a data transmission system having a signal channel for continuously transmitting blocks of information including data words or idle words and an acknowledgment word for indicating the position of any incorrect word in a previously transmitted one of said blocks, said blocks including multiword messages and unrelated single-word messages, said multiword and single-word messages being stored in respective multiword and single-word message buffers at a transmitting end of said signaling channel, a method of correcting erroneously transmitted messages including multiword messages whose integrity may have been interrupted in transmission by the injection of an unrelated single-word message, comprising accessing, responsive to the receipt over said signal channel of said acknowledgment word, a status word corresponding to said transmitted one of said blocks, said status word having a bit of predetermined value in a bit position corresponding to a word position in the transmitted block contributed by a respective one of said message buffers;

comparing the values of the corresponding bit positions of said acknowledgment word and said status word to determine which of said buffers contributed an erroneous word to said one of said blocks; and marking for retransmission the contents of said message buffers which contributed said erroneous data word.

* * * * *